March 4, 1958 A. F. SPERRY ET AL 2,825,620

LINE SPACE MEMORY AND COUNTER FOR ELECTRIC TYPEWRITER

Filed March 21, 1955 8 Sheets-Sheet 1

Inventors:
Albert F. Sperry
and Ralph Arthur Anderson
By: Russell E Hattis
Atty

LINE SPACE MEMORY AND COUNTER FOR ELECTRIC TYPEWRITER

Filed March 21, 1955 8 Sheets-Sheet 2

Inventors,
Albert F. Sperry
and Ralph Arthur Anderson
By: Russell E. Hattis
Atty March 4, 1958 A. F. SPERRY ET AL 2,825,620

LINE SPACE MEMORY AND COUNTER FOR ELECTRIC TYPEWRITER

Filed March 21, 1955 8 Sheets-Sheet 3

Inventors
Albert F. Sperry
and Ralph Arthur Anderson
By: Russell E Hattis Atty

LINE SPACE MEMORY AND COUNTER FOR ELECTRIC TYPEWRITER

Filed March 21, 1955 8 Sheets-Sheet 4

Inventors,
Albert F. Sperry
and Ralph Arthur Anderson
By: Russell & Hatt
Atty.

March 4, 1958 A. F. SPERRY ET AL 2,825,620

LINE SPACE MEMORY AND COUNTER FOR ELECTRIC TYPEWRITER

Filed March 21, 1955 8 Sheets-Sheet 5

Inventors,
Albert F. Sperry
and Ralph Arthur Anderson
By: Russell E. Hattis Atty.

March 4, 1958 A. F. SPERRY ET AL 2,825,620

LINE SPACE MEMORY AND COUNTER FOR ELECTRIC TYPEWRITER

Filed March 21, 1955 8 Sheets-Sheet 6

Inventors.
Albert F. Sperry
and Ralph Arthur Anderson
By: Russell E. Hattis Atty

LINE SPACE MEMORY AND COUNTER FOR ELECTRIC TYPEWRITER

Filed March 21, 1955 8 Sheets-Sheet 7

Inventors,
Albert F. Sperry
and Ralph Arthur Anderson
By Russell E Hall
Atty

March 4, 1958 A. F. SPERRY ET AL 2,825,620

LINE SPACE MEMORY AND COUNTER FOR ELECTRIC TYPEWRITER

Filed March 21, 1955 8 Sheets-Sheet 8

Inventors,
Albert F. Sperry
and Ralph Arthur Anderson
By: Russell E. Hattis
Atty.

United States Patent Office 2,825,620 Patented Mar. 4, 1958

2,825,620

LINE SPACE MEMORY AND COUNTER FOR ELECTRIC TYPEWRITER

Albert F. Sperry, Chicago, and Ralph A. Anderson, Deerfield, Ill., assignors to Panellit, Inc., Skokie, Ill., a corporation of Illinois Application March 21, 1955, Serial No. 495,492

23 Claims. (Cl. 346—34)

This invention relates primarily to automatic process logging systems, particularly to systems utilizing an automatic typewriter to record or log the various conditions of a complicated industrial process. Some aspects of the invention, however, have a more general application.

Information is the foundation upon which the science of automatic control is built. In order to put a process or a machine under effective control, there must be sufficient information available to completely characterize all of its operations. Once this information is converted into visible signals or messages, it can be compared with more or less predetermined criteria, and intelligent, corrective action can be applied to achieve the desired status where abnormal process variables are indicated. This invention concerns itself with a means for placing before an operator large masses of this information in preferably printed form so that it can be reviewed. It more particularly concerns itself with an improvement over the automatic process logging system apparatus disclosed in United States Patent No. 2,701,748, granted February 8, 1955, to Ralph Arthur Anderson.

In the above patent, the exemplary automatic process logging system disclosed includes mechanism for continuoulsy scanning a large number of variables and feeding electrical data signals to an automatic typewriter which prints numerical data representing the actual values scanned at any instant. Data on the monitored variables are printed in vertical columns in longitudinally spaced segments of a logging sheet where the number of variables involved is greater than a single line of the sheet can accommodate. Thus, one segment of the logging sheet may, for example, contain data information over, say, a twenty-four hour period for one-half of the total number of variables involved and another segment of the logging sheet may contain data for the same period on the remainder or a portion of the remainder of the variables. Data on all scanned variables is preferably fed to the typewriter for printing regularly, such as hourly, necessitating constant indexing of the logging sheet from the first to a second or subsequent segment of the logging sheet and then back again to the first segment of the logging sheet at or before the initiation of each hourly period so that data on the same variables are grouped together.

After the initial hourly scanning and recording of all variables, the system continues to scan all variables but prints only data on abnormal variables between the regularly hourly scanning cycles in a space provided on the logging sheet below the last logging sheet segment, which space will sometimes be referred to as the off-normal space. Suitable line spacing control apparatus is provided which automatically indexes the logging sheet the proper number of lines between segments of the log sheet and from the last printed line of the last segment of the sheet to the next available line in the off-normal space. The number of lines which the logging sheet must be indexed at a given instant to effect the latter result varies with both the number of lines of data in the last segment of the log sheet as well as the number of lines of abnormal data previously printed in the off-normal space, the latter being usually an unpredictable quantity. In the system disclosed in the patent, apparatus is provided which counts and memorizes the number of lines printed in the log sheet segments and in the off-normal space. Also, computer apparatus is provided which adds and subtracts these quantities, since each line added to the last segment of the log sheet subtracts one line from the spacing required between the last line of the last segment and the off-normal space and each line added to the off-normal space increases the spacing required between the last segment of the log sheet and the next complete line in the off-normal space.

It is one of the objects of the present invention to provide improved line space control apparatus which is less complex, less expensive and more reliable than the line space control apparatuses previously utilized to control the aforementioned automatic typewriter.

Another object of the present invention is to provide line space control apparatus which includes mechanical means driven with the log sheet and cooperating electrical apparatus controlled by said mechanical means and which in turn controls the log sheet driving means so that a feed back loop is provided whose controlling functions are responsive to the actual position of the log sheet rather than to some other means independent of such position, as in the case of the apparatus of the above-mentioned patent.

A still further object of the invention is to provide line space control apparatus for automatically indexing a log sheet to spaced areas of the log sheet and which is so constructed and arranged that only minor changes in the apparatus are necessary to adapt the same for use with different line spacing programs necessitated, for example, by an increase or decrease in the number of log sheet segments or the number of lines in each segment.

It is another one of the objects of the present invention to provide line space control mechanism which controls the operation of the feed roll on the carriage of an automatic electric typewriter independently of the carriage return solenoid of the typewriter. A related object of this invention is to provide line space control apparatus as above described wherein the log sheet is indexed to receive printing successively in different areas of the log sheet and the sequence is repeated necessitating constant return of the log sheet to a first area thereon by mechanism which reverses the indexing direction of the log sheet to return to said first area, thereby eliminating the necessity of utilizing a continuous band log sheet. A log sheet of almost any length may thus be utilized increasing the amount of information which a given log sheet may contain. Obviously, with a continuous band log sheet, the number of available lines in the log sheet is limited by the spacing between the log sheet supporting rollers on the typewriter carriage.

In accordance with the invention, line space control apparatus is provided having a control member which is driven with the log sheet and which includes suitably positioned control elements which actuate switches or the like at predetermined points in the path of travel thereof. The switches in turn control the operation of the means which drives the feed roll on the typewriter carriage so that a feed back loop is provided which is responsive to the actual position of the log sheet. This increases both the reliability and flexibility of the system for reasons which will be apparent as this description proceeds.

In one form of the invention, all line indexing operations are performed by turning the log sheet in the same direction, thereby necessitating the use of a continuous band log sheet. Line space control mechanism includes, in one example, a rotatable control member driven by the carriage feed roll which member makes one complete revolution as the feed roll is rotated an amount to index the log sheet once around plus one line space unit, the spacing between lines in the log sheet segments. The control member carries a number of switch actuating pins, one pin for each segment, and the pins are spaced apart a distance or angular amount proportional to the spacing between the log sheet segments. Switch means located in the path of travel of the switch actuating pins are adapted to terminate a line spacing operation when actuated by the pins. On the completion of a line in any segment of the log sheet, the log sheet is automatically indexed one line which removes the active pin from the switch means to initiate a blind or continuous line indexing operation which is terminated again when the succeeding pin actuates the latter switch. Precessing of the log sheet one line is automatically accomplished since the first pin on the control member actuates the aforementioned switch means once for each revolution of the control member which, as above explained, occurs when the log sheet has precessed or advanced one line following a complete recording cycle. Further rotation of the control member effects a similar line spacing program which stops the log sheet at points where it receives printing on the line below the last printed line in each of the log sheet segments. If it becomes necessary to vary the line spacing program, the aforementioned control member may be replaced with a new control member having pins spaced in accordance with the new line spacing program. In a preferred form of the invention, the control member is provided with a large number of variously positioned switch actuating pin receiving holes so that the line spacing program may be varied by simply re-positioning the pins as desired.

In the case where it is desired to utilize every line in the off-normal space of the log sheet, the line space control apparatus must be responsive to the location of the last printed line in the off-normal space so that the log sheet may be indexed the proper number of lines from the last printed line in the last segment of the log sheet to the next complete line in the off-normal space.

In accordance with the invention, the latter function is obtained by a pair of rotatable control members in addition to the one above described. One of the additional control members is driven in synchronism with the log sheet feed roll and is adapted to make one complete revolution for each complete turn of the log sheet. The angular position of this member therefore corresponds to the line of the log sheet positioned to receive printing at any instant. A switch actuating pin projects from the latter control member and is adapted to actuate a switch carried by the third control member which is driven independently of the carriage feed roll. The position of the second and third control members is initially adjusted so that the aforementioned control pin of the second control member will actuate the last mentioned switch when the control member pin is in an angular position corresponding with the first line in or adjacent to the off-normal space of the log sheet. Actuation of the latter switch terminates a line spacing operation.

Means is provided for switching control over line spacing from the first control member to the second control member upon completion of printing in the last segment of the log sheet so that the last mentioned switch actuating pin of the second control member will stop the log sheet adjacent to said off-normal space. The third control member which carries the last mentioned switch is automatically rotated one angular unit as each line of printing in the off-normal space is completed. The second control member must therefore rotate one additional angular unit to enable its control pin to actuate the switch the next time the logging sheet is to be positioned for printing in the off-normal space. The log sheet is therefore automatically indexed to the proper line in the off-normal space.

Simplification of the line space control apparatus may be obtained where no more than one complete line of off-normal data for each hourly or other unit period is desired, and where it is felt to be unnecessary to utilize each line of the off-normal space. The second and third control members may be omitted by precessing the log sheet one line in the off-normal space for each turn or cycle of operation of the log sheet. If no off-normal data was printed in the off-normal space during the previous hour, the line set aside in the off-normal space for this data would be skipped. With this arrangement, the number of lines which the log sheet is indexed between the last printed line of the log sheet and the off-normal space is a fixed quantity so that line spacing in the off-normal space may be effected by merely adding a switch actuating pin to the first control member.

In accordance with another form of the invention, the log sheet is in the form of a non-continuous strip so that the direction of rotation of the carriage feed roll is reversed to return the log sheet to the next available line in the first log sheet segment. The feed roll on the typewriter carriage in this case is preferably driven by a reversible electric motor rather than by pulsing of the carriage return solenoid of an automatic electric typewriter.

To insure precessing or advancement of the log sheet one line for each cycle of operation of the log sheet, the switch means actuated by the control pins of the first control member is advanced or precessed one angular unit each recording cycle so that the first control pin will actuate the switch means when the log sheet is returned to a position to receive printing in the next available line in the first segment of the log sheet. On initiation of each hourly recording period, suitable means is actuated which advances or precesses the aforementioned switch means. This feature is also applicable in a recording system where the log sheet is in the form of a continuous belt and feed roll rotation is not reversed. Also, the use of an electric motor to drive the carriage feed roll is feasible and often desirable in the continuous belt log sheet recording system.

The mechanism constituting the aforementioned three control members and their related switching apparatus forms a compact integral assembly which is readily attachable to the shaft of the feed roll of a conventional automatic electric typewriter. Many of the above features of the line space control mechanism have application in recording equipment generally, such as with manually operated typewriters where only automatic line spacing is desired to position a record sheet to receive any kind of typed data successively in various widely spaced portions of the sheet.

These and other objects, advantages and features of the invention will become apparent upon making reference to the specification to follow, taken in conjunction with the drawings showing a preferred exemplary embodiment of the invention.

In the drawings.

Reference should now be made to the drawings where like reference characters indicate like elements throughout.

*General description*

Figure 1:
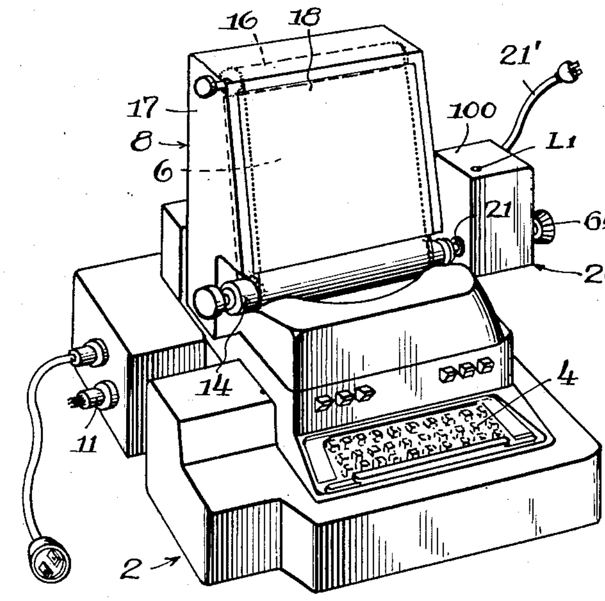
Fig. 1 is a perspective view of an automatic typewriter which has been modified according to the present invention.

Refer now more particularly to Fig. 1 which illustrates an automatic electric typewriter 2 modified in accordance with the invention. The typewriter 2 may be basically any well known type of automatic typewriter as, for example, the typewriter presently sold under the trade name of "Flexowriter," manufactured by the Commercial Controls Corporation. As is conventional in these typewriters, a keyboard 4 is provided for manual typing to permit an operator to add notations or headings to a logging sheet 6 which in one form of the invention is a continuous band supported on a modified typewriter carriage assembly, generally indicated by the reference numeral 8. Process variable information obtained in the form of electrical signals are fed to the typewriter for printing through a cable 11 which may include five conductors representing a 5-channel code, and other control lines, such as a red ribbon shift control line which will be referred to generally hereinafter. The five conductors in the cable 11 may be energized in different combinations to represent the letters of the alphabet, numbers, punctuation marks, and line spacing directions. Of course, the typewriter includes suitable code-receiving and translating mechanism for actuating the keys of the typewriter automatically in response to the signals received by the typewriter. Line spacing in one form of typewriter is effected by pulsing what is known as a carriage return solenoid, which spaces the record sheet one line per pulse in only one direction and returns the carriage to a position to initiate a new line.

The continuous band logging sheet 6 is supported in extended position on the typewriter carriage by means of a bottom feed roll 14 which is rotated in response to the pulsation of the carriage return solenoid, and an upper idler roll 16 supported in bearings in a carriage housing frame 17. Suitable toothed sprocket wheels on the rolls cooperate with perforations 24 on the log sheet to control precisely the line indexing of the log sheet. The housing includes a front transparent window 18 through which approximately one-half of the logging sheet is continuously visible. By means of suitable fastening means (not shown) the housing 17 may be removable to gain access to the continuous band logging sheet for removal and replacement thereof.

In accordance with the invention, line space control mechanism 20 forming a compact housed assembly is mounted on the typewriter carriage. The assembly 20 includes gearing, to be described, which is connected with the shaft 21 of the feed roll 14. The gearing carries control elements, to be described, which actuate control switches at different points in their path of travel. The switches are connected to relay apparatus through a cable 21' extending from the line space control assembly 20 and the relay apparatus completes a feed back loop by controlling the energization of the typewriter carriage return solenoid through a conductor in the typewriter input cable 11.

*Record and line space operations to be performed on log sheet*

Figure 2:
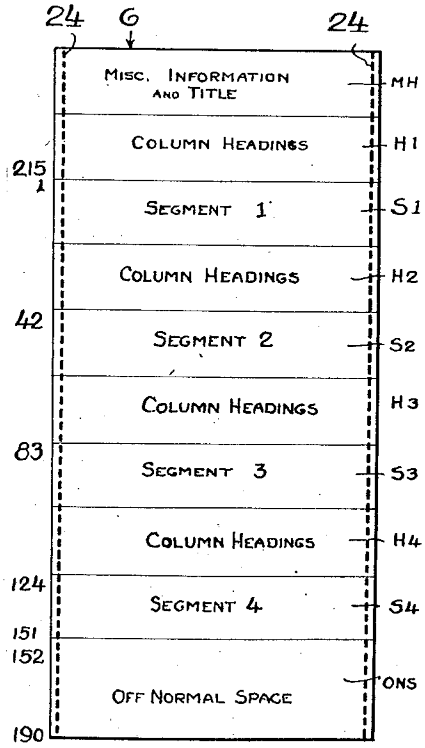
Fig. 2 is an enlarged view of a strip of paper which when joined end to end forms a continuous band logging sheet usable in the typewriter of Fig. 1.
Figure 9:
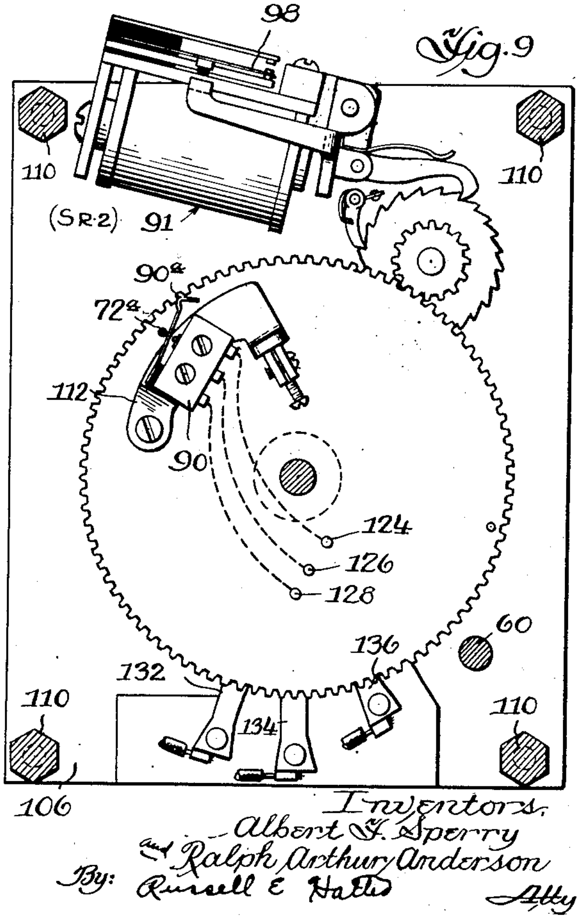
Fig. 9 is a sectional view through the apparatus of Fig. 7, taken along section line 9—9 thereof.
Figure 3:
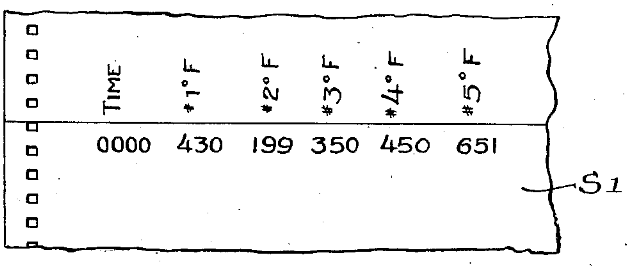
Fig. 3 is an enlarged fragmentary view of one part of the log sheet of Fig. 2, with variable data therein.

In order to understand the functions to be performed by the line space control apparatus, it would be helpful to understand first of all the different types of line spacing operations which are to be performed by the typewriter. In this regard, reference should now be had to Fig. 2 showing a view of the log sheet 6 before it has been joined end to end to form a continuous band log sheet. The log sheet 6 has four identically sized segments S–1, S–2, S–3 and S–4 for receiving regular or hourly data information in vertical columns for the variables, all hourly data information for each variable being grouped together in the same column of one of the segments for a twenty-four period for example. Heading spaces H–1, H–2, H–3 and H–4 are provided above each segment in which the variables are identified. A main heading space MH is provided at the top of the sheet for information common to all variables. Below the last segment is a space ONS in which data on off-normal variables scanned is automatically printed subsequent to the hourly recording in the segments S–1 through S–4. The data information to be typed in the first segment S–1 may comprise data on fifty variables arranged in respective vertical columns, as shown in Fig. 3. Where regular data recording is carried out hourly, segment S–1 would have at least twenty-four lines. Sometimes it is desired to record data on all variables between the regular hourly periods upon actuation of a manual read-out switch or the like and so additional lines are provided for this purpose in each segment.

The first column in segment S–1 contains a number representing the time during which the variables in that segment were scanned (see Fig. 3) and succeeding vertical columns in the first segment contain numbers representing the actual values of the variables scanned, the identification of the variable and the units of the data being obtained in the corresponding column in the heading space H–1. When the number of variables scanned is greater than the number of available vertical columns in segment S–1, there will also be similar data in the next lower segment S–2 of the log sheet. When the first line of segment S–1 is filled with data, the logging sheet is automatically indexed to bring the corresponding line of the second segment S–2 in position to receive printing of data on other variables scanned during a scanning cycle. In the example illustrated, corresponding lines in the first and second segments are spaced forty-one lines apart so that if the first line in segment S–1 is considered to be line one, the first line in segment S–2 would be line number forty-two of the log sheet. Upon completion of a line in segment S–2 the log sheet is indexed to receive printing in the corresponding line of segment S–3. The first line of segment S–3 is shown to be spaced forty-one lines from the first line in the second segment so that line one of segment S–3 is line number eighty-three of the log sheet. The segment S–3 accommodates data of variables which cannot be accommodated in segment two.

Figure 4:
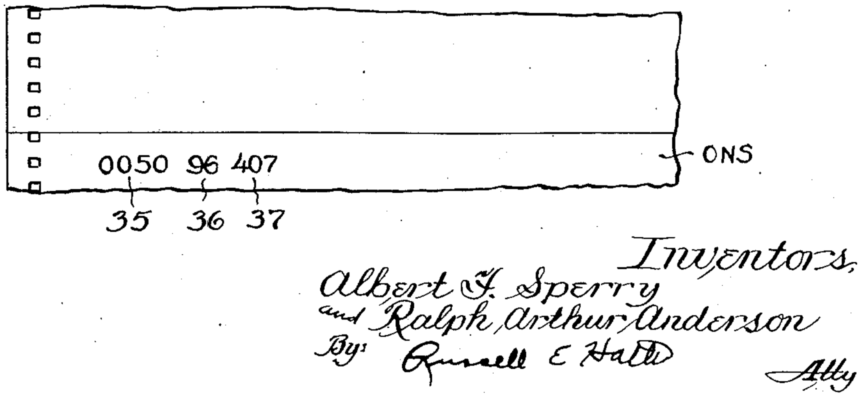
Fig. 4 is an enlarged fragmentary view of another portion of the log sheet of Fig. 2 with abnormal data printed therein.

Following the completion of a line in segment S–3, the log sheet is again indexed to receive printing in the corresponding line of the fourth segment S–4 if segment S-3 cannot accommodate the remainder of the variables. The first line of segment S-4 is shown as line number one hundred twenty-four of the log sheet. Following the completion of a scanning cycle at the beginning of a given hour (a scanning cycle may take five or six minutes for two hundred variables at fifty variables per segment), printing of variable data under normal conditions ceases until the beginning of the next hourly period. However, variables are continuously scanned between spaced regular hourly scanning cycles for monitoring of abnormal variables. When an abnormal variable is scanned, the logging system feeds data on the abnormal variables to the typewriter for printing in the off-normal space ONS located beneath the last segment S-4 of the logging sheet. In the illustrated embodiment, the first line of the off-normal space ONS is the line number one hundred fifty-two of the log sheet. Thirty-nine lines are provided in the off-normal space ONS for off-normal data. If desired, the apparatus may be designed also to record data on variables which have just returned to normal in the space ONS. Apparatus for performing this function is disclosed in co-pending application Serial No. 470,859 entitled, "Automatic Process Logging System," filed November 24, 1954, by one of the co-inventors of the present invention, Ralph Arthur Anderson. An example of the type of data which might be printed in the off-normal space ONS is shown in Fig. 4. Each group of data may comprise a first number 35 which represents the time at which the off-normal data was taken, a second number 36 which represents an identification number for the variable, and a third number 37 representing the value of the variable. Data on additional variables which become abnormal between successive regular hourly scanning cycles are printed in the same line of the off-normal space.

In a preferred form of the invention, the log sheet is indexed from the last segment S-4 to the next available complete line in the off-normal space ONS, even though the last line recorded in the space ONS had not been completely filled. Assuming that no off-normal data has been previously recorded in the off-normal space, it can be seen that the spacing required to index the log sheet from the last printed line of the last segment S-4 to the first line in the off-normal space decreases by one for each basic recording cycle or period, which was assumed to be a one hour period. Further, this spacing increases by one line for each line containing recorded data in the off-normal space.

Just prior to the beginning of a regular hourly scanning cycle, the log sheet must be indexed from the off-normal space to the next available line of the first segment S-1. When the log sheet is indexed in one direction only, and the log sheet is thereby formed into a continuous band, the log sheet is indexed once around, a total of two hundred sixteen lines in the above example, plus the number of lines equal to the spacing between successive lines in the segments (one line in the example) between the beginning of successive hourly scanning cycles.

It should be understood that the line spacing program above described may vary widely. For example, the number of segments may be varied, the number of lines in each segment may be varied, and the number of lines in the entire log sheet may be varied.

*Block diagram of entire logging system (Fig. 5)*

Figure 5:
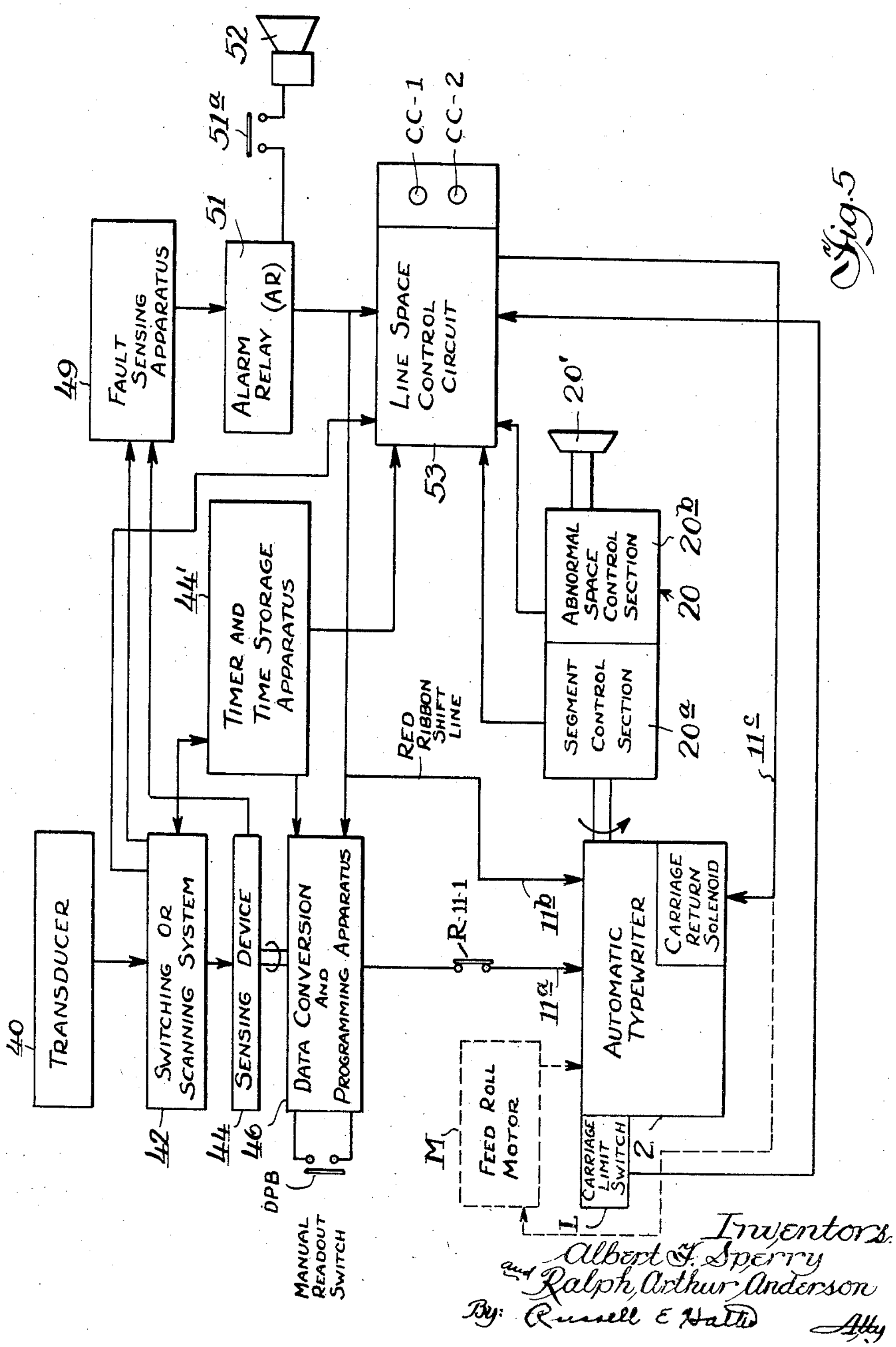
Fig. 5 is a block diagram of the components making up the complete automatic process logging system including the typewriter apparatus of Fig. 1.

Before other details of the preferred embodiment of the invention are described, it would be helpful to first understand the overall organization of a data recording system in which the invention is utilized. Refer now to Fig. 5 showing a block diagram of an entire automatic process logging system including the automatic typewriter of Fig. 1. The system includes transducers represented by the box 40, there being one transducer element for each process variable on which information is desired. Each transducer produces a variable voltage, current, resistance, or phase angle, etc., output which is a function (preferably a linear function) of the value of the associated process variable. In the case where temperatures are measured, the transducer element associated with the temperature variable may be a thermocouple or a temperature sensitive element. Where other process variables relating to pressure or flow are involved, suitable well known transducers for converting measurements to voltages or other electrical quantities which vary in a fixed relationship to the values of the process variables may be provided. The outputs of the various transducer elements are sequentially coupled by scanning switches 42 to a sensing device 44, which may be a null-balancing potentiometer. The switching system 42 may comprise a number of stepping switches driven by suitable timing apparatus 44. This timing apparatus may include a synchronous motor and a number of cam-operated switch contacts which interrupt electrical circuits to provide properly timed pulses for operating stepping switches and other parts of the system.

The sensing device 44 may provide a mechanical output in the form of a shaft movement, the angular position of which is a measure of the magnitude of the signal voltage fed to the sensing device by the scanning system. Shaft movement is coupled to conversion apparatus represented by the block 46 which converts data from analogue to digital form and this information is stored in suitable relay or other storage means to permit sequential feeding of the digital data to the automatic typewriter in the form of suitable coded signals to operate the typewriter under control of suitable programming apparatus also represented by box 46. Programming apparatus for performing similar functions are well known and, in the present instance, may comprise banks of stepping switches which sequentially feed digital data on the variables as well as timing information from a digital time storage unit forming part of the timing apparatus 44', in the form of coded electrical signals, to the typewriter input. For example, at the initiation of the regular hourly recording interval, the programmer operates to feed coded information to the typewriter to effect sequential printing of four numbers representing the time at which the data was scanned (see the first column of numbers in Fig. 3). Following this, the programmer feeds variable data to the typewriter as each variable is scanned which is printed in segment No. 1. The programmer then ceases to feed information to the automatic typewriter until the logging sheet has been indexed to receive information in the next or second segment S-2. Then the programmer initially again feeds time data to the typewriter to record timing information in the first column of the second segment followed by variable data on the successive variables scanned which are recorded in the remainder of the line of the second segment. This procedure repeats itself until all variable data is printed within the segments S-1 through S-4.

Wherever a variable scanned is abnormal, apparatus is provided for controlling the color of the printing of data on that variable and for actuating an audible alarm. This apparatus includes suitable fault sensing apparatus represented by the box 49 which compares an electrical output of the sensing device 44 with individual high and low set point potentiometers for each variable. Whenever the output of the sensing device indicates that the value of the scanned variable has exceeded certain predetermined safe limits, the fault sensing apparatus 49 energizes an alarm relay 51, also hereinafter referred to as relay AR, which performs numerous control functions. For one, a contact of this relay connects with the automatic typewriter through a conductor 11*b* of the cable 11 to energize the red ribbon shift solenoid of the typewriter to bring the red portion of the ribbon into position to receive the type. This occurs during printing in the segments S-1 through S-4 and the off-normal space. Contacts of the alarm relay are also arranged to sound an audible alarm 52 which is silenced by depression of an acknowledge push button 51a subsequent to the recording of the regular hourly scanned data in the segments S–1 through S–4. The alarm relay controls, through the programmer, the feeding of data to the automatic typewriter for printing in the off-normal space ONS previously referred to when abnormal variables are scanned. After a regular recording of data in the segments, the scanning switch 42 continues to scan the transducer outputs but the programmer fails to feed the scanned data to the automatic typewriter except when the alarm relay is energized to indicate the existence of an abnormal variable. The programmer then feeds information on this abnormal variable preferably only once to the automatic typewriter 2, until the variable has returned to normal. Apparatus for limiting the information fed to the typewriter in this manner is disclosed in copending application Serial No. 470,859, entitled "Automatic Process Logging System," filed November 24, 1954, by Ralph Arthur Anderson.

In a manner to be more fully explained hereinafter, the alarm relay also has contacts in a line space control circuit generally indicated by the box 53. The circuit 53 operates in conjunction with the line space control mechanism 20, previously referred to, to provide a feed back loop which controls the operation of a carriage return solenoid in the typewriter 2. As previously stated, energization of the carriage return solenoid causes indexing or line spacing of the log sheet through the medium of the feed roll 14. Mechanism 20, which will be described hereinafter, comprises a first group of mechanism referred to as a segment control section 20a which controls indexing of the logging sheet to the various segments S–1 through S–4, and a second section 20b which controls spacing between the last printed line of the last segment S–4 and the off-normal space ONS.

In certain situations it may be preferable to drive the carriage feed roll by means other than the carriage return solenoid, as, for example, by an electric motor M. In such case the control circuit 53 would be connected to operate the electric motor rather than the carriage return solenoid.

A control knob 20′ on the line space control mechanism 20 also performs a resetting or zeroing function to be described. Push buttons CC–1 and CC–2 are interposed in the line space control circuit to perform disabling and reset functions required to disable the system when the log sheet is changed and to reset the line space control mechanism 20 to initiate a new recording cycle at the beginning of a twenty-four hour period. A manual push button control DPB is also provided for on demand recording of all scanned variables within the log sheet segments S–1 through S–4 between the hourly periods. It is desirable to print such on demand or manual read-out data in the regular segments rather than in the off-normal space ONS, as in the embodiment described in said Patent 2,701,748. Such on demand data, of course, is printed within the appropriate columns of log sheet segments.

*Line space control mechanism (Figs. 6–11)*

Figure 6:
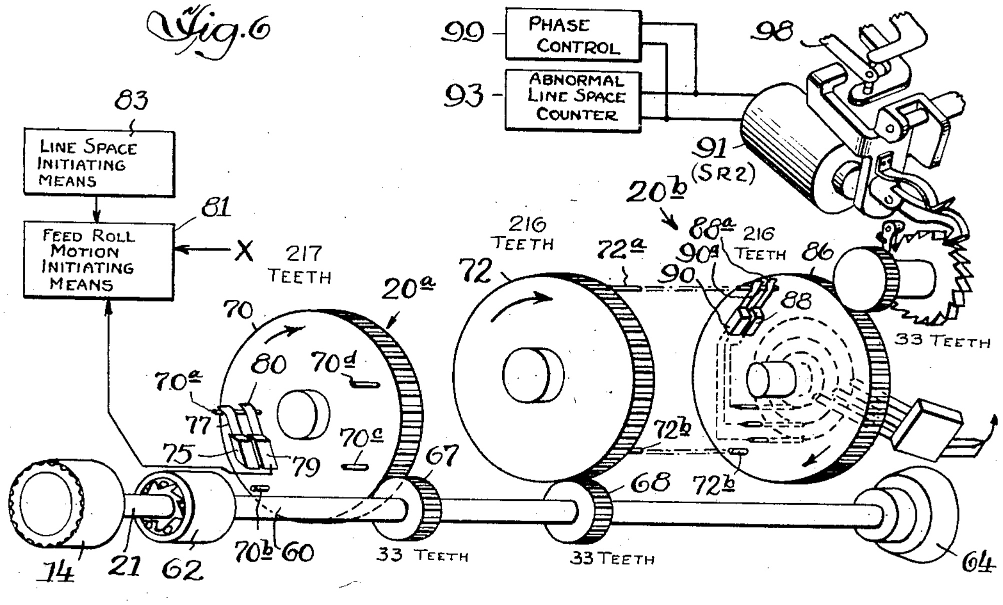
Fig. 6 is an exploded partially diagrammatic view of the line space control mechanism forming part of the typewriter mechanism of Fig. 1.
Figures 7, 11:
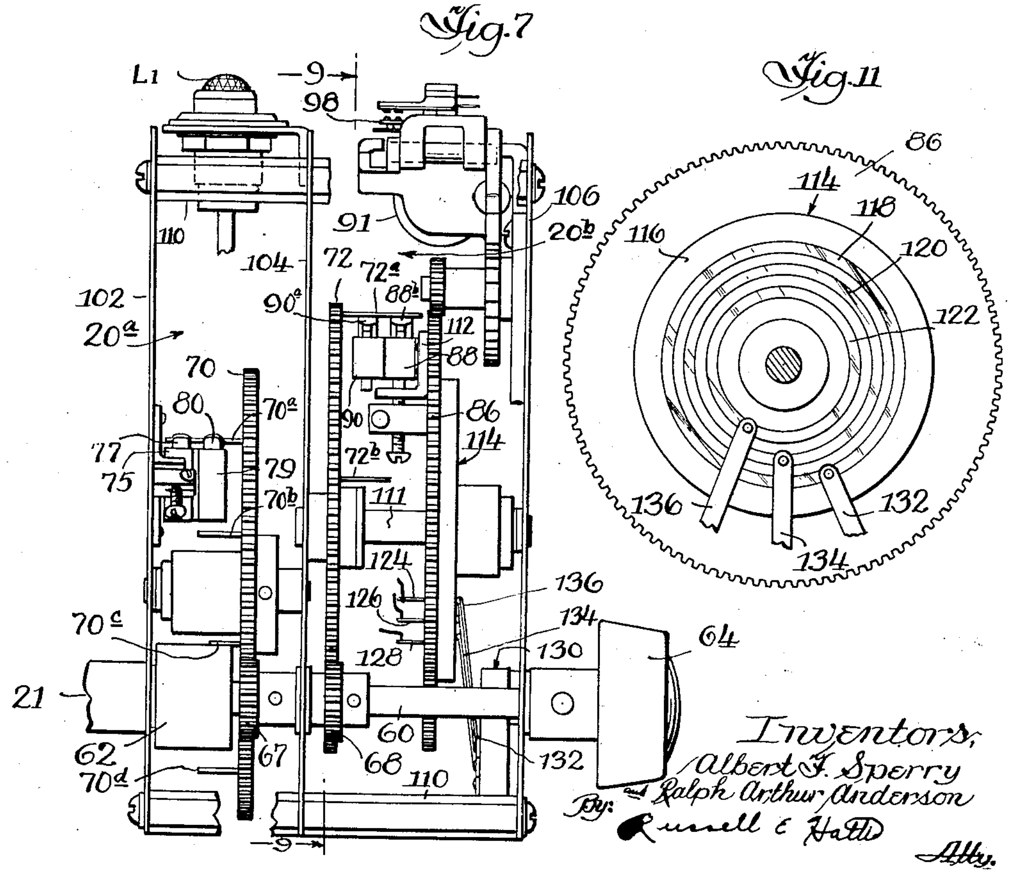
Fig. 7 is a view of this mechanism as it is actually constructed in one preferred form of the invention, with the cover removed.
Fig. 11 is a side view of the opposite side of the control member forming part of Fig. 9.

To begin a more detailed explanation of the line space control mechanism comprising the present invention, refer more particularly to partially diagrammatic Fig. 6 which illustrates the components making up the line space control mechanism 20. As previously stated, the mechanism 20 is driven by feed roll shaft 21 so that it responds directly to the actual position of the logging sheet relative to the type-receiving portion of the typewriter. When the log sheet has been moved into proper position to receive printing, the mechanism 20 terminates the movement of the feed roll 14.

The mechanism 20 includes a shaft 60 which is coupled to the feed roll shaft 21 through a unidirectional clutch 62. Rotation of the feed roll shaft 21 in a direction to index the logging sheet in a counter-clockwise direction as viewed from the left hand end of the feed roll is imparted to the shaft 60 through the clutch 62. The clutch is adapted so that rotation of the shaft 60 by the control knob 64 on the end thereof will not be imparted to the feed roll 14. This is required for certain phasing operations which will be hereinafter explained. The shaft 60 carries a pair of identical pinion gears 67—68 which respectively mesh with cam gear wheels 70 and 72. The cam gear 70 is a part of the segment control section 20a of the mechanism 20 and therefore controls the spacing of the logging sheet within the segments S–1 through S–4. The other cam gear 72 in conjunction with other mechanism to be described controls the spacing between the last segment of the logging sheet S–4 and the off-normal space ONS.

For purposes of illustration, it will be assumed that the segment control cam gear 70 contains a number of teeth corresponding to the number of lines around the continuous band logging sheet 6 plus the spacing between successive lines in the segments S–1 through S–4. In the example illustrated, the segment control cam gear 70 contains two hundred sixteen plus one (217) teeth.

The off-normal space control cam gear 72 contains a number of teeth equal to the number of lines around the log sheet, namely two hundred sixteen teeth. Since the drive pinions 67 and 68 contain the same number of teeth, rotation of the segment control cam gear one revolution will rotate the off-normal space control cam gear 72 one revolution plus one tooth.

The segment control cam gear 70 carries axially extending switch actuating pins 70a, 70b, 70c and 70d. The four pins fall along a common circle coaxial with the shaft of rotation of the segment control gear 70. The switch actuating pin 70a is somewhat longer than the other three pins for reasons to be explained. Also, the pin 70b is spaced forty-one teeth, namely the number of lines between the corresponding lines of the first and second segments of the log sheet, and the third pin 70c is spaced from the second pin 70b forty-one gear teeth, which corresponds in number to the number of lines between the corresponding lines of the second and third segments. The fourth switch actuating pin 70d is spaced from the third pin 70c forty-one gear teeth which represents the spacing between corresponding lines of the third and fourth segments of the logging sheet. All four pins 70a through 70d cooperate with a stationary switch 79 having a spring metal switch arm 80. The arm 80 is in the path of movement of the pins 70a through 70d. When a pin rides up against the distal end of the arm 80, contacts of the switch 79 are closed. A secondary stationary switch element 75 is provided which has a spring metal switch actuating arm 77 in the path of movement of only the longer switch actuating pin 70a. This switch is used in phasing the gear in a manner to be explained. Contacts of the switch 79 are closed when the long pin 70a rides upon the distal end of the switch arm 80. The actuation of the switch 79 by any of the pins 70a through 70d disables or deenergizes the feed roll motion imparting means, generally indicated by the box 81 in Fig. 6, which may include the carriage return solenoid of the typewriter, an electric motor, etc.

Normally, when the segment control gear pins are out of contact with the switch arm 80, the feed roll continues to rotate until engaged by one of the aforementioned pins. The pin 70a, for example, actuates the switch 79 to cease line spacing when the first segment of the logging sheet is indexed in a position to receive printed data. Following the completion of this line, line space initiating means, generally indicated by the box 83, steps the feed roll to disengage the pin 70a from the switch 79 to initiate a continuous line spacing operation, When the next pin 70*b*, rotating in a clockwise direction as viewed in Fig. 6, engages the switch arm 80, line spacing again ceases thereby providing proper indexing between the segments S–1 and S–2.

Following the end of the printing of a line in segment S–2, similar line spacing operations are repeated whereby the pins 70*c* and 70*d* successively control the positioning of the logging sheet to receive printing in the proper lines of the third and fourth segments of the logging sheet. Since the segment control gear 70 makes one revolution as the feed roll rotates a sufficient distance to move the log sheet once around, two hundred sixteen lines, plus the spacing between successive lines in the segments, it can be seen that the control gear 70 automatically positions the logging sheet to receive printing in the next available line in the segments for each cycle of operation of the logging sheet. As soon as the line in the last segment S–4 is complete, control of the line spacing is temporarily transferred to section 20*b* of the line space control mechanism 20. Control over line spacing is returned to the cam gear 70 just prior to the regular hourly recording intervals so that the logging sheet is indexed to a position to receive printing in the next available line in the first logging sheet segment, in a manner to be more fully described hereinafter.

As previously stated, section 20*b* of the line space control apparatus 20 controls the spacing of the logging sheet between the last segment S–4 and the off-normal space ONS. Section 20*b* includes the cam gear 72 previously mentioned which is driven by the feed roll through the shaft 60, and a gear 86 which is mounted for rotation coaxially of the cam gear 72, which carries a pair of switches 88 and 90. The switch carrying gear 86 is driven independently of the cam gear 72 by an indexing solenoid 91 which when pulsed drives the gear 86 through a ratchet pawl and gear coupling. The gear 86 has the same number of teeth as the cam gear 72 and is rotated an amount equal to the angular spacing between adjacent teeth each time the index solenoid is pulsed once. The index solenoid is pulsed upon the completion of a line in the off-normal space ONS or when line spacing in the off-normal space is otherwise desirable. The circuit referred to as an abnormal space line counter, identified as box 93 in Fig. 6, controls the operation of the index solenoid 91. The counter counts the number of off-normal data groups in the off-normal space of the log sheet and pulses the solenoid 91 once as the end of a line in space ONS is reached.

The switches 88 and 90 on the solenoid operated gear 86 cooperate with a pair of pins 72*a* and 72*b* extending axially from the right face of the cam gear 72. The pin 72*a* is much longer than the pin 72*b* and is adapted to actuate the resilient switch arm 88*a* of the switch 88. The shorter pin 72*b*, on the other hand, is only long enough to actuate the switch arm 90*a*. When the switch 90 is actuated by the pin 72*b*, a line spacing operation is terminated. The switch 90 is therefore connected to operate the feed roll motion imparting means 81 shown in box form in Fig. 6. The switch 88 performs resetting or phasing operations to be described.

When the automatic process logging system is initially put into operation, for example at the beginning of a twenty-four hour period, the relative positions of the gears 72 and 86 are adjusted such that the long pin 72*a* of the gear 72 rests on the projecting end of the switch arms 88*a* and 90*a*. The other pin 72*b* of the cam gear 72 is spaced from the long pin 72*a* in a clockwise direction viewed from the left of the gear a number of teeth equal to the number of lines between the first line of the log sheet segment S–1 and the line before the first line of the off-normal space ONS. With the logging sheet of Fig. 2, this would be one hundred fifty (151 minus 1) teeth. When the first line of the last log sheet segment S–4 is complete, the line space initiating means, which may be a carriage limit switch, acts upon the feed roll motion imparting means to initiate a line spacing operation by rotating the feed roll 14 which in turn, through the shaft 60 and the similar drive pinion gears 67 and 68, rotate the gears 70 and 72 in a clockwise direction. Through suitable control circuitry to be described control over line spacing at this point is removed from the gear 70 and transferred to the gear 72 so that line spacing continues until the pin 72*b* of the gear 72 rides upon the projecting end of the switch arm 90*a* of the switch 90. This occurs when the log sheet is positioned to receive printing in line No. 151 and it then terminates a line spacing operation. However, for reasons which will be apparent as this description proceeds, the occurrence of an abnormal variable will automatically cause a pulsing of the solenoid 91 to effect a single line spacing operation so that off-normal data is printed in the first line of the off-normal space ONS (line number 152 of the log sheet). Pulsing of the index solenoid 91 rotates the gear 86 one tooth in a clockwise direction which disengages the pin 72*b* from the switch arm 90*a*. This effects energization of the carriage return solenoid or other motive source forming a part of the feed roll motion imparting means 81, until the pin 72*b* again rides upon the projecting end of the switch arm 98. Obviously, this occurs when the gear 72 is stepped one tooth, the gear 72 thereby following the movement of the solenoid driven gear 86. The completion of a line in the off-normal space results in the pulsing of the index solenoid 91, as above explained, which in turn steps the gear 86 one tooth and the gear 72 accordingly follows. At the beginning of a regularly hourly recording interval, control over line spacing is taken away from the gear 72 and transferred to the gear 70. The line spacing operation immediately begins because all of the pins 70*a* through 70*d* of the gear 70 have already been moved past the switch arm 80. When the logging sheet was positioned to receive typing within the off-normal space, the switch 80 assumed a position between the last pin 70*d* and the first pin 70*a*. Once the gear 70 has taken control, the feed roll 14 will continue to rotate and line space the log sheet until the longest pin 70*a* rides upon the projecting end of the switch arm 80. This stops the line spacing operation in a position where the log sheet is ready to receive printing at the beginning of the line below the last printed line in the log sheet segment S–1. Of course, as the feed roll drives the gear 70 it also drives the gear 72 so that when the line spacing operation last mentioned ceases, the long pin 72*a* of the gear 72 will now be one tooth ahead of its position at the beginning of the previous hour, corresponding to the one line of precession or advancement of the log sheet during that time. This is so because the gear 72 keeps in step with the log sheet since it makes one revolution as the log sheet is indexed once around. Since the solenoid operated gear 86 is not affected by rotation of the feed roll 14, its switches remain in the same position they were in just prior to the initiation of the new hourly recording period.

When the gear 72 takes control following the printing in the last line of the log sheet segment S–4, the log sheet will be positioned to receive printing in the last printed line of the off-normal space ONS (or in line 151 if no previous data was printed in the space ONS) when the pin 72*b* rides upon the switch arm 90*a*. Then, the scanning of an abnormal variable will result in the stepping of the solenoid operated gear 86 one tooth in a clockwise direction which in turn results in the indexing of the log sheet one line, when the pin 72*b* again rides upon the switch arm 90*a*. Then, the log sheet will receive its printing in the next full line beneath the last printed line in the off-normal space ONS.

Refer now to Figs. 7 through 10 which illustrate the arrangements of the line space control mechanism 20, with the cover 100 shown in Fig. 1 removed. The line space control assembly 20 includes three parallel spaced rectangular support plates 102, 104 and 106 which are joined together by the spacer bolt assemblies 110. The drive shaft 60 is rotatably mounted between the plates 104 and 106 and projects axially beyond both of these plates. The left hand end of the shaft 60 carries the gear 67 and the unidirectional clutch 62, the latter making connection with the feed roll shaft 21 passing through a hole in the plate 102. The right hand projecting end of the shaft 60 carries the phasing control knob 64. The gear 68 is located between the plates 104 and 106.

The segment control gear 70 is rotatably mounted between the plates 102 and 104 and its pins make engagement with the switch arms 77 and 80, as above explained, forming part of a switch assembly including the switches 75 and 79 which are supported by a bracket upon the inner face of the left hand plate 102. The phasing light L–1 is supported by a bracket secured to the intermediate plate 104. In a manner to be explained, the phasing light L–1 lights up when the long pin 70*a* of the segment control gear is in its switch actuating position.

Rotatably mounted upon a shaft 111 extending between the plates 104 and 106 are the gears 72 and 86. The switches 88 and 90 form an assembly which are secured to the left hand face of the gear 86 by a bracket 112. Three wires (not shown) extend from the switches 88 and 90, one wire being a common wire to the two switches. These three wires connect, respectively, with three pins 124, 126 and 128 extending from the left hand face of the gear 86. The pins make contact with a commutator assembly 114 carried on the right hand face of the gear 86.

Commutator assembly 114 includes an insulating disk 116 in which is embedded three concentric conductive commutator rings 118, 120 and 122. The pins 124, 126 and 128 make electrical contact, respectively, with these conductor rings. Wiper arms 132, 134 and 136 supported from the right hand plate 106 make sliding contact, respectively, with the conductive rings 118, 120 and 122.

Also supported from the right hand plate 106 is the solenoid 91 and its associated pawl, ratchet and gearing mechanism coupled with the gear 86.

Figures 8, 10:
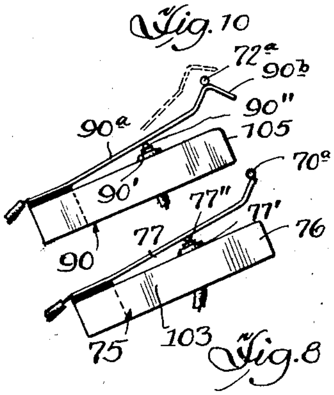
Fig. 8 is a side view of a switch operated by one of the control members forming part of the apparatus in Fig. 7.
Fig. 10 is a side view of one of the switch elements actuated by the control member shown in Fig. 9.

The construction of the switches 75 and 90 is shown respectively in Figs. 8 and 10. The switches 79 and 88 are constructed the same as the switches 75 and 90 respectively. The switch 75 has an insulating base 103 from which extends a stationary button contact 77′. Supported from the base 103 is a resilient spring arm 77 carrying a button contact 77″ which makes contact with the button contact 77′ when the switch arm 77 is depressed by the pins of the segment gear 70 riding upon the projecting end of the switch arm 77.

The switch 90 is similar to the switch 75 having an insulating base 105 and a stationary button contact 90′. The base 105 carries a spring switch arm 90*a* having the button contact 90″ adapted to make contact with the button contact 90′ when the switch arm 90 is depressed by the pins of the gear 72 riding upon a projecting portion at the end of the arm. The spring 90*a* differs from the previously mentioned arm 77 in that it includes a depending lip 90*b* which is necessary to cam the pin 72*a* of the gear 72 into switch actuating position when the solenoid 91 rotates the gear 86 into a homed or phasing position, in a manner to be explained hereinafter. In other words, in the operation of the mechanism, the pins of the gear 72 move into switch actuating position from either side of the projecting portion of the switch arm 90*a*. The pins of the gear 70, on the other hand, in the embodiment involved, are brought into switch actuating position from only one side of the switch arm 77.

Figure 12:
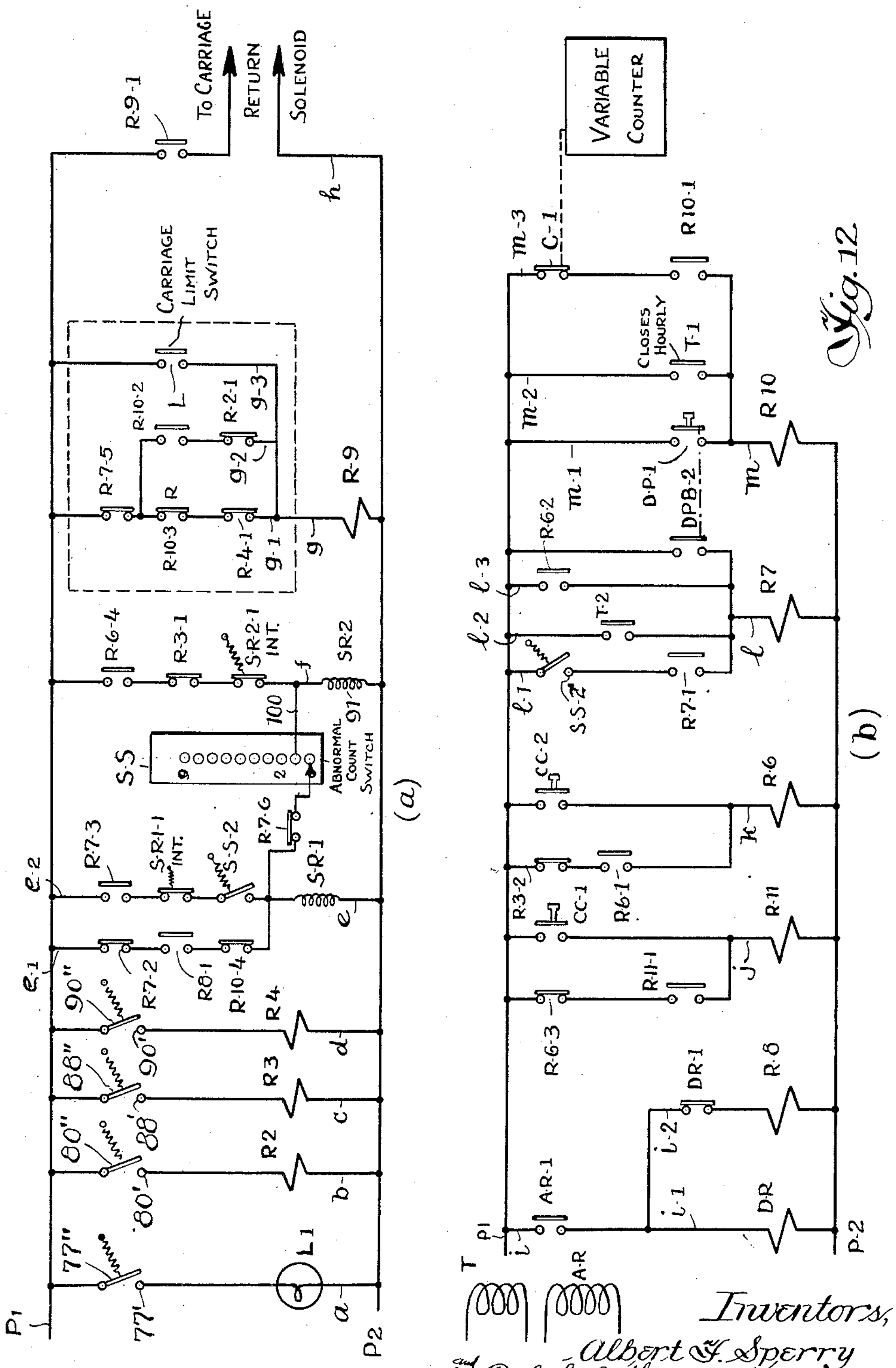
Fig. 12 is a schematic diagram of an electrical control circuit controlled by the mechanism of Figs. 6 through 11.

*Electrical control circuit* (*Fig. 12*)

Refer now to Fig. 12 which shows a schematic across the line diagram of the electrical control circuitry controlled by the line space control mechanism. The various branches of the circuit there shown are identified alphabetically beginning with the branch in the upper left hand corner of the figure. The circuit will be described by first stating a function and then tracing the circuit which performs the function. The contacts of the relays are identified by the same reference character used for the associated relay plus a number identifying the contact. The switches are shown in their positions when the associated relay is de-energized.

The first operation to be performed is the placement of a log sheet on the log sheet carriage in position to receive typing, as illustrated in Fig. 1. To this end, a chart change push button CC–1 (see Figs. 5 and 12) located externally of the typewriter apparatus is provided as shown in Fig. 1. Depression of this push button prevents any printing operations on the typewriter. The contacts of the push button CC–1 are located in a branch *j* (see Fig. 12) extending between the power lines P1—P2. Depression of the push button energizes the relay R–11 in that branch which seals in through a holding circuit including holding contacts R–11–1 and normally closed contacts R–6–3 connected between the upper terminal of the relay coil R–11 and the power line P–1. Energization of the relay R–11 opens normally closed contacts R–11–1 of this relay (see Fig. 5) in the input line 11*a* to the automatic typewriter to disable the operation thereof. The operator then inserts a new logging sheet on the typewriter carriage and manually adjusts the position thereof to receive printing in the first line of log sheet segment S–1. Then he manually phases the segment control gear 70 of the line space control mechanism 20 by turning the knob 20′ until the light L–1 at the top of the housing (Fig. 1) of the line space control mechanism 20 is lit. Rotation of the knob 20′ is not transmitted to the carriage feed roll because of unidirectional clutch 62. Energization of light L–1 indicates that the long pin 70*a* of the gear 70 is in its switch actuating position against the switch arms 77 and 80 of the switches 75 and 79, respectively. Contacts 77″ and 77′ of the switch 75 are in a branch circuit *a* and are in series with the light L–1 so that closing of the latter switches energizes the light L–1. At the same time, the contacts 80″ and 80′ of the switch 79 in a branch circuit *b* including a relay R–2 are closed. The contacts of the relay R–2 form no particular function during the phasing operation and their function and operation will be described hereinafter.

Next, a resetting push button CC–2 is momentarily depressed which phases the gears 72 and 86 by effecting rotation of the gear 86 until the switch arm 88*a* is depressed by the long pin 72*a* on the gear 72. When the gears 72 and 86 are phased, contacts 88″—88′ and 90″—90′ of these switches are closed to energize relay coils R–3 and R–4 respectively in branches *c* and *d*. When the gears 72 and 86 are phased, the short pin 72*b* is spaced one hundred fifty angular line units or teeth from the switch arm 90*a* so that when the gear 72 takes control over line spacing the log sheet will be stopped in position to receive printing in line No. 151.

The resetting push button CC–2 when closed energizes the chart change relay coil R–6 in branch *k* which seals in through a holding circuit including normally open holding contacts R–6–1 and normally closed contacts R–3–2. Upon energization of relay coil R–6, contacts R–6–4 in branch *f* establishes energization of the index solenoid 91 in branch *f* which branch also includes solenoid interrupter contacts 98 which continue to pulse the solenoid and thereby rotate the third gear 86 in a clockwise direction until the long pin 72*a* on the gear 72 depresses the switch arm 88*a* into its switch closing position. This closes contacts 88″ and 83′ of the switch 88 in the branch *c* which energizes relay R–3 in that branch. The holding circuit of relay R–6 in branch *k* is broken when the gears 72 and 86 are phased by the opening of normally closed contacts R–3–2 and relay R–3 is energized by the closing of the switch 88. Contacts 90″ and 90′ of the switch 90 also close and energize a relay R–4 in branch *d*. The contacts of the R–4 relay perform no function at this moment.

The relay R–3 has normally closed contacts R–3–1 in the branch circuit *f* leading to the index solenoid 91 so that when the third gear 86 is homed or phased, energization of relay R–3 opens the energization circuit to the index solenoid to terminate the stepping of the index solenoid and the consequent indexing of the switch carrying gear 86.

Energization of relay R–6 results in the closing of normally open contacts R–6–2 in a sub-branch 1—3 of branch *l*. The contacts R–6–2 are in series with relay coil R–7 and therefore energize the same upon the closing of the latter contacts. The relay R–7 is sealed in through a holding circuit in sub-branch *l—l* which includes the normally opened holding contacts R–7–1, and homing contacts SS–2′ of an abnormal count stepping switch SS. The abnormal count stepping switch SS counts and memorizes the number of off-normal variable groups within the active line in the off-normal space. (Of course, other types of counters could be used in place of stepping switch SS.) In the example illustrated, it is assumed that each line in the off-normal space will hold ten groups of off-normal data. Actually, each line may hold more data groups than this but a small number is selected for exemplary purposes. The stepping switch has ten contact positions, one, the zero position, being a home position to which the switch is actuated on the initiation of each regular scanning period each hour in the illustrated embodiment. The stepping switch SS is stepped one position each time the stepping switch solenoid SR1 in branch *e* is pulsed by suitable ratchet and pawl mechanism (not shown).

Energization of relay R7 closes normally open contacts R–7–3 in branch *e*–2 and establishes an energization path for the stepping switch solenoid SR1 through interrupter contacts SR1–1 of the stepping switch solenoid SR1 and homing contacts SS–2 of the stepping switch which open when the stepping switch is positioned to its zero or home position. The stepping switch solenoid SR1, therefore, continues to step the stepping switch until homing contacts SS–2 of the stepping switch open in the sub-branch *e*–2. When the stepping switch is in its home position, homing contacts SS–2′ of the stepping switch in branch *l—l* also open to break the holding circuit to relay R–7.

Energization of relay R–7 resulting from the depression of the reset push button CC–2 also opens the normally closed relay contacts R–7–5 in series with parallel sub-branches *g*–1 and *g*–2 and a line spacing relay R–9. This disables or de-energizes line spacing operation since the opening of line spacing relay R–9 opens its normally open contacts R–9–1 in branch *h* leading to the carriage return solenoid. Line spacing is not desired during the resetting operation since the log sheet was previously adjusted manually to receive printing in the first line. When the above-mentioned resetting operation is complete, the resultant deenergization of relay R–7 actuates the branch circuit *g* which is energized when either sub-branch *g*–1 or *g*–2 is complete. The relay R–9 may also be energized through a sub-branch *g*–3 carrying the carriage limit switch L.

Initiation of printing of data in the log sheet segments may be effected by one of two ways. It may be accomplished automatically by the timing apparatus 44 (see Fig. 5) which periodically, preferably at the beginning of each hour, energizes a relay T–1 (see Fig. 12) which momentarily causes the closing of contacts T–1 in branch *m* and T–2 in sub-branch *l*–2. Momentary closing of contacts T–1 energizes the log relay R–10 in branch *m* which seals in through a holding circuit including normally open contacts R–10–1 and normally closed contacts *c*–1. The log relay R–10 has contacts in sub-branches *g*–1 and *g*–2 in the branch containing the line space relay R–9. In sub-branch *g*–1 the normally closed contacts R–10–3 are in series with the normally closed contacts R–4–1 of relay 4 which in turn is controlled by the second gear 72 of the line space control mechanism 20. The other sub-branch *g*–2 contains the normally open contacts R–10–2 and the normally closed contacts R–2–1 of relay R–2 which in turn is controlled by the segment space control gear 70. Therefore, when relay R–10 is energized, control over line spacing is transferred from the gear 72 to the segment control gear 70. If the gear 70 had not been previously manually reset to its zero position, and the log sheet was indexed to the off-normal space, closing of the timing switch T–1 would initiate a blind spacing operation which would be terminated when the long pin 70*a* actuated the switch arm 80. At that time, the relay R–2 would become energized upon the closing of contacts 80″ and 80′ of the switch 80 which in turn would open the contacts R–2–1 to deenergize the line space relay R–9.

Following the completion of the printed line in the first segment of the log sheet S–1, an arm on the carriage (not shown) trips the carriage limit switch L connected in sub-branch *g*–3 leading to the carriage return relay R–9. The carriage limit switch is closed to energize relay R–9 which energizes the carriage return solenoid to effect a single line spacing operation and return the carriage to its farthest right hand margin position. When this occurs, blind line spacing operation begins because movement of the log sheet one line also results in the movement of both gears 70 and 72 through the transmission of the feed roll shaft 21, clutch 62, shaft 60 and pinion gears 67 and 68. The switch actuating pin 70*a* of the segment control gear 70 is moved clockwise away from the switch arms 77 and 80 thereby resulting in the opening of the switches 80″—80′. This de-energizes the relay R–2 and closes normally closed contacts R–2–1 in sub-branch *g*–1 which energizes the line spacing relay R–9. Contacts R–9–1 in the branch *h* are thereby closed to energize the carriage return solenoid which continues to line space until the next switch actuating pin 70*b* of segment control gear 70, spaced forty-one gear teeth from the long pin 70*a*, comes into contact with the projecting end of the switch arm 80 of the switch 79. Then contacts 80″ and 80′ of switch 80 are then again closed energizing the relay R–2 which in turn opens the normally closed contacts R–2–1 to terminate the line spacing operation. Then, the log sheet is positioned to receive printing in the first line of the second log sheet segment S–2.

Upon completion of the last-mentioned line, the carriage limit switch L is again tripped to initiate another line spacing operation which in turn is terminated when the third pin 70*c* actuates the switch arm 80. In a similar manner, the pin 70*d* of the segment control gear 70 positions the logging sheet to receive printing in the last segment S–4 of the log sheet. When the last variable has been scanned and recorded in the last space provided therefor in the fourth log sheet segment, normally closed contacts C–1 in sub-branch *m*–3 leading to the relay R–10 is momentarily opened to break the holding circuit of the latter relay. Contacts C–1 may be controlled from a suitable variable counter which actuates a relay (not shown) controlling the contacts C–1 when the last variable has been printed. The variable counter may be the stepping switch which comprises the scanning system 42 shown in box form in Fig. 5. The latter stepping switch system 42 obviously has one contact associated with each variable and when the stepping switch contacts leave the last contact of that system a relay can be energized in a suitable manner to momentarily open the normally closed contacts C–1. This de-energizes the relay R–10 which in turn transfers control over the energization of the line space relay R–9 from the sub-branch *g*–2 to the branch *g*–1 containing the normally closed contacts R–10–3. At that instant, the normally closed contacts R–4–1 are closed because the relay R–4 is de-energized since neither the pin 72a nor the pin 72b of the gear 72 is in position to actuate the switch 88. The line spacing operation therefore continues until the short pin 72b comes into contact with the switch arm 90a of switch 90. This will occur when the log sheet is positioned to receive printing in line 151, which for reasons to be explained is one line ahead of the first line in which printing is desired in the off-normal space.

When the fault sensing apparatus 49 (Fig. 5) senses an abnormal variable, the alarm relay AR is energized which closes normally open alarm relay contacts AR–1 in branch *i* (Fig. 12). The alarm relay contacts AR–1 are in series with two alternates branches *i*–1 and *i*–2. A slow acting relay DR in branch *i*–1 has normally closed slow acting contacts DR–1 in sub-branch *i*–2 which are in series with a relay R–8. The relay R–8 energizes until the normally closed slow acting relay contacts DR–1 open. The last-mentioned relay has normally open contacts R–8–1 in sub-branch *e*–1 which sub-branch also includes normally closed contacts R–7–2 of the then de-energized relay R–7 and normally closed contacts R–10–4 of the then de-energized relay R–10. An energization circuit is therefore established to the stepping switch solenoid SR–1 which steps the switch SS one position to indicate or count the existence of one abnormal variable whose data is to be printed in the off-normal log sheet space ONS. Since the movable contact of the stepping switch SS had been previously homed to its zero position, the aforementioned stepping of the switch one position brings the movable contact of the stepping switch into engagement with its No. 1 stationary contact, to which is connected a lead 100 joining a terminal of the index solenoid. Energizing voltage is thereby fed to the index solenoid through an energization circuit including power line P–1, normally closed contacts R–7–2 in sub-branch *e*–1, the then closed contacts R–8–1, the then closed normally closed contacts R–10–4, the then closed normally closed contacts R–7–6, the No. 1 contacts of the stepping switch, lead 100 and index solenoid 91 or SR–2 connected to power line P–2.

The slow acting relay DR is connected so that its normally closed contacts DR–1 seal in after a delay which is sufficient to enable the stepping switch SS to be stepped one position and the index solenoid 91 to be actuated as above described. Then, as the contacts DR–1 open in sub-branch *i*–2, relay R–8 becomes de-energized which opens normally open contacts R–8–1 in sub-branch *e*–1 to terminate or complete the pulsing of the stepping switch and the index solenoid. As the index solenoid is pulsed once, the third gear 86 of the line space control mechanism moves clockwise one tooth which results in a single line spacing operation of the log sheet as the feed roll 74 rotates to position the short pin 72b of the gear 72 in contact with the switch arm 90a. The log sheet is now positioned in the first line of the off-normal space ONS. The recording of the abnormal data of all scanned abnormal variables then proceeds in the log sheet space ONS until the beginning of the next regular or hourly recording cycle. When the fault sensing apparatus 49 senses another abnormal variable, the aforementioned function of the apparatus is repeated except that the index solenoid 91 is not pulsed again until the movable contact of the stepping switch again is positioned to the No. 1 stationary contact position. (The index solenoid is only connected with the No. 1 of the stepping switch.) As above stated, it is assumed that the off-normal space will hold data on only ten abnormal variables. When the movable wiper of the stepping switch is moved from the last or the No. 9 contact, the next pulsation of the stepping switch solenoid SR through the branch *e*–1 will bring the movable contact thereof to its zero or home position. The next or eleventh variable sensed between successive hourly recording periods will again move the movable contact of the stepping switch into engagement with the No. 1 stationary contact position resulting in a pulsing of the index solenoid to initiate a line spacing operation of the log sheet so that the log sheet is positioned to receive printing in the second line of the off-normal space.

If less than a complete line, that is, less than ten off-normal variables are scanned when the log sheet is positioned in its off-normal space, it is desirable to begin a completely new line in the off-normal space upon completion of a subsequent recording in the log sheet segments S–1 through S–4. This result is accomplished by homing the stepping switch to its zero position at the beginning of each hourly recording cycle. As above explained, at the beginning of each new regular hourly recording cycle, the timing contacts T–1 of the timing relay T close momentarily as do the timing relay contacts T–2 in subbranch *l*–2. Relays R–10 and R–7 therefore become energized with the result that control over line spacing is transferred from sub-branch *g*–1 to sub-branch *g*–2 so that the segment control gear 70 controls the line spacing operation to index the log sheet to receive printing in the next available line of the first log sheet segment. Energization of relay R–7 results in the homing of the stepping switch SS to its zero position. A new series of variable data is then recorded successively in the log sheet segments S–1 through S–4.

It should be noted that when the fault sensing apparatus 49 senses an abnormal variable during the regular recording cycle, the audible alarm 52 is sounded and the typewriter automatically prints the abnormal data in the segments in red as the alarm relay AR is energized. Energization of the alarm relay AR during this period of the regular logging sequence does not result in a homing of the stepping switch SS or the pulsing of the index solenoid because of the normally closed contacts R–10–4 in sub-branch *e*–1 which are open during the regular recording operation in the log sheet segments.

It should be noted that the outputs of the transducers 40 are continuously scanned by the system, and when the log sheet is positioned to receive printing in the off-normal space ONS this could result in a duplication of data in the off-normal space if the fault is not quickly corrected, since the alarm relay AR may energize each time the scanning system scans the transducer having the abnormal output. A means for limiting the operation of the system to record new abnormal data only once until the variable has returned to normal is the aforementioned co-pending application Serial No. 470,859.

Where no more than one line of off-normal data in the off-normal space ONS of the log sheet is contemplated, the line space control mechanism may be greatly simplified by omitting the gears 72 and 86 in the control circuitry associated therewith. In this case, by precessing the log sheet in the off-normal space one line during each complete recording cycle, the line spacing between the last printed line of the last segment of the log sheet and the off-normal space will remain constant. By adding an additional pin on the segment control gear 70 which is spaced the appropriate amount from the last switch actuating pin 70–*d*, an automatic line spacing operation within the off-normal space may be effected with a substantial reduction in mechanical and electrical apparatus.

Where the operator desires to obtain data of all scanned variables during other than the regular recording intervals, he depresses the manual read-out push button DPB which has contacts DPB–1 in parallel with the timing contacts T–1 in the branch containing the relay R–10. This energizes relay R–10 which seals in through holding contacts R–10 to initiate a recording and line spacing sequence identical to that effected by the hourly closing of the timing contacts T–1. Depression of the manual push button contacts also close contacts DPB–2 in parallel with the timing contacts T–2 in the branch circuit containing the reset relay R–7. Relay R–7 then becomes energized to perform the various resetting functions above mentioned. The manual read-out data for the variables are printed in their corresponding respective columns in the log sheet segments S–1 through S–4 in the same manner as for regular recorded data, and log sheet indexing to the next complete line in the off-normal space is accomplished as above described.

Figure 13:
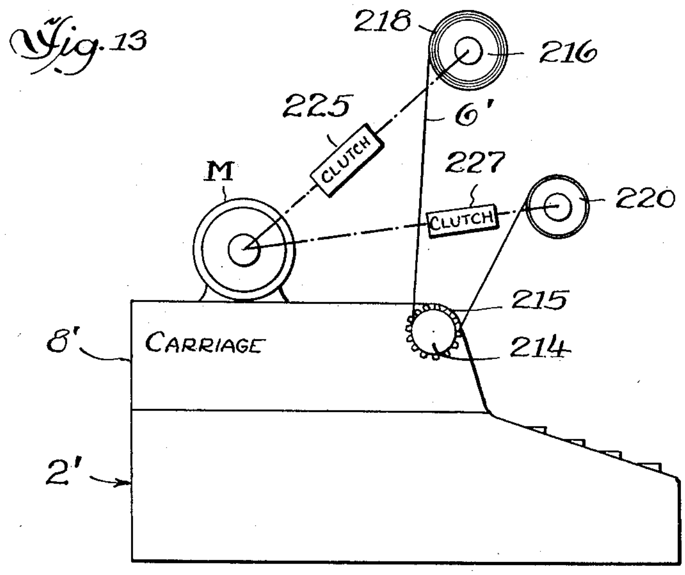
Fig. 13 illustrates a modification of the typewriter apparatus in Fig. 1.
Figure 14:
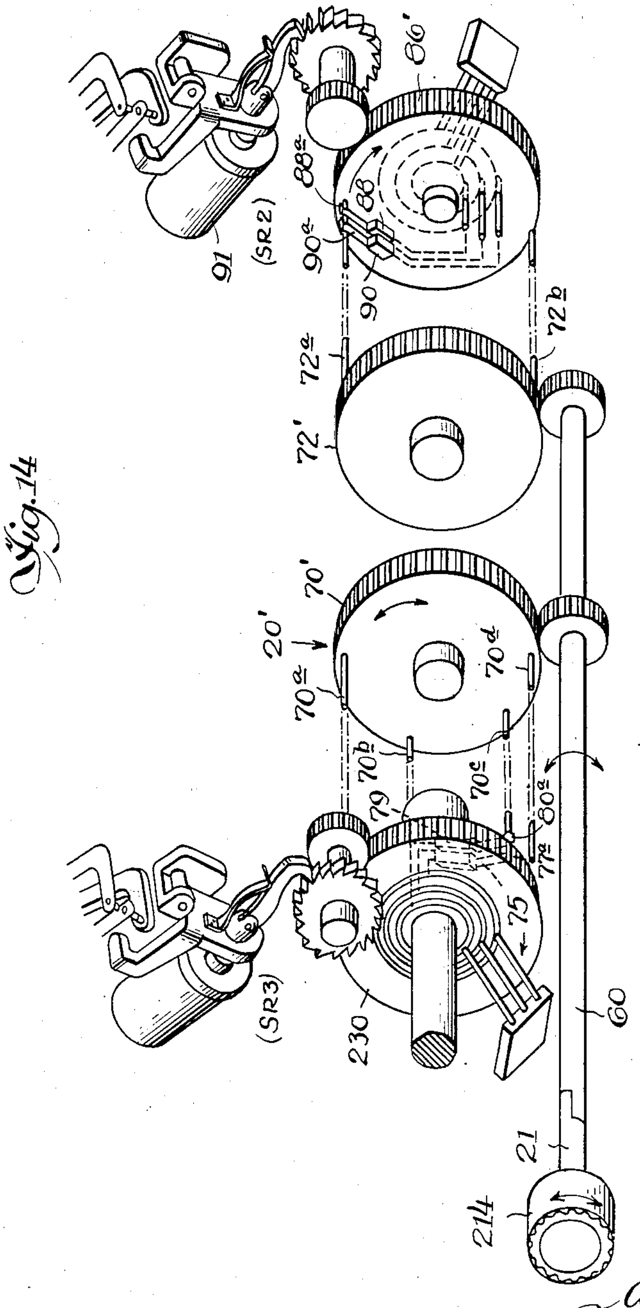
Fig. 14 is an exploded view of a modified form of space control mechanism used with the embodiment of Fig. 13.
Figure 15:
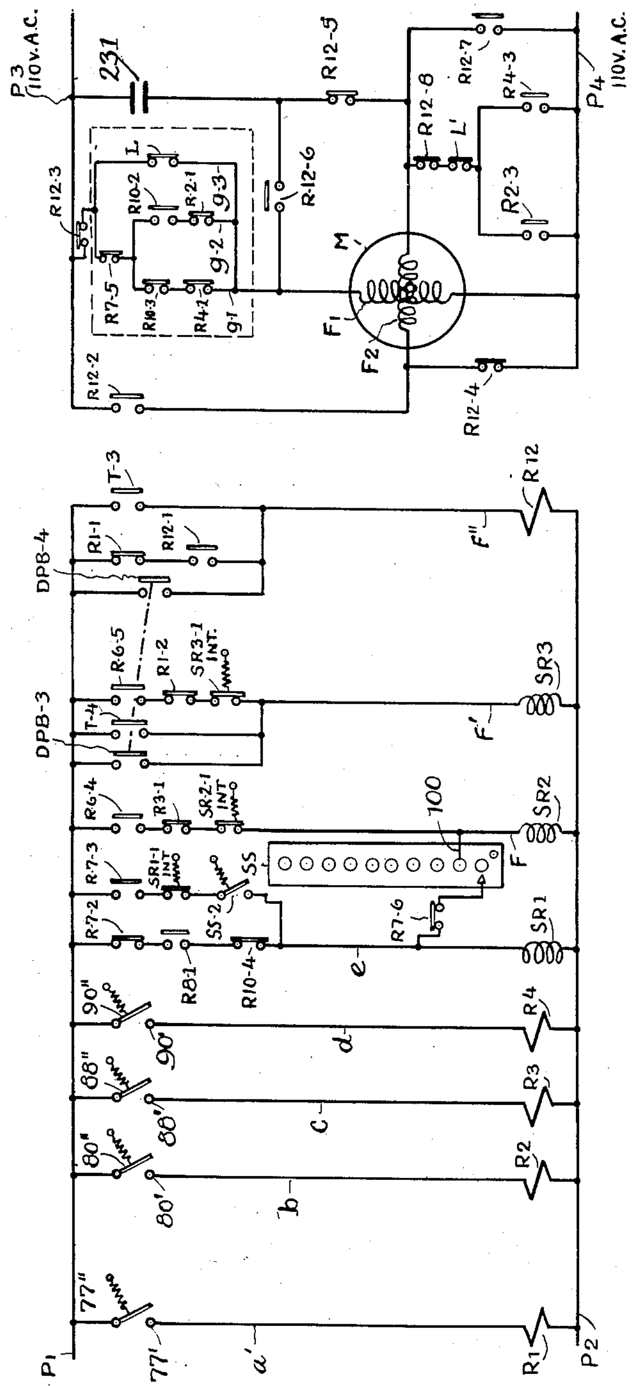
Fig. 15 is a schematic diagram of electrical circuit apparatus controlled by the mechanism of Fig. 14.

*Embodiment of Figures 13 through 15*

The use of a continuous belt log sheet, of course, limits the total number of available lines in each log sheet. The size of the log sheet is dependent upon the spacing between the rolls 14 and 16 of the typewriter carriage. There are certain installations where a great deal of off-normal data may be anticipated requiring a log sheet of appreciable length and which would require a continuous belt log sheet of greater length than would be practical. For this and other reasons it therefore sometimes is desirable to provide a log sheet which is mounted on the carriage of the typewriter in the form of a roll of paper of indefinite length, rather than a continuous belt log sheet as previously described. Such an arrangement is shown in Fig. 13 to which reference should now be had. In accordance with this form of the invention, the typewriter carriage includes a main upper feed roll 216 on which is rotatably mounted a log sheet spool comprising an indefinite number of layers or windings of log sheet material wound thereabout. A portion of the log sheet roll is unwound from the spool to extend around what is now a lower idler roll 214 containing a toothed sprocket wheel 215 which passes through perforations in the log sheet. The end of the log sheet is then connected to a third roll 220 about which the log sheet may wind and unwind during the various line spacing operations. A sufficient amount of log sheet material is provided above the first line in the first segment so that the log sheet never completely unwinds from the third roll 220 during the regular line spacing operations.

The modified log sheet 6′ used with the embodiment of the invention shown in Fig. 13 may contain the same segment arrangement as shown in Fig. 2 with the off-normal space being of substantially greater length.

The rolls 216 and 220 of the typewriter carriage are driven from an electric motor M preferably mounted on the typewriter carriage. The motor is coupled to the rolls 216 and 220 through suitable unidirectional clutches 225 and 227 such that rotation of the motor M in one direction will drive the roll 220 in a clockwise direction as shown in Fig. 13, to perform the various line spacing operations previously mentioned, which indexes the log sheet to receive printing from the first segment of the log sheet to the off-normal space ONS of the log sheet 6′. In this operation the log sheet is unwound from the roll 216 and wound about the roll 22. Control over line spacing is effected through line space control apparatus similar to that previously described, which is driven from the idler roll 214. This line space control mechanism controls an electrical circuit which in turn controls the energization of the electric motor M, in a manner to be described.

The log sheet 6′ is returned hourly to a position to receive printing in the next line in the first segment of the log sheet through operation of the above-mentioned mechanical and electrical control apparatus which effects rotation of the electric motor M in the opposite direction than before to rewind the log sheet on the feed roll 216 and unwind the log sheet from the roll 220.

The aforementioned clutch mechanism, which may be unidirectional spring clutches of a type well known in the art, is arranged so that rotation of the electric motor M in said opposite direction will automatically uncouple the motor M from the feed roll 220 and couple the motor to the other feed roll 216 to drive the feed roll in a direction to wind the log sheet onto the roll 216 and unwind the log sheet from the roll 220. Conversely, when the motor is driven in the other or forward direction the motor will be coupled to the roll 220 but uncoupled from the roll 216.

Refer now to Fig. 14 which shows the line space control mechanism 20′ usable with the embodiment of Fig. 13. This line space control mechanism is similar to the line space mechanism shown in Fig. 6. This new mechanism includes the drive shaft 60 which is connected directly to the shaft 21′ of the idler roll 214.

The drive pinions 67 and 68, as before, are designed to rotate a segment control gear 70′ and off-normal space control gear 72′ respectively, one tooth as the idler roll 214 is rotated an amount to index the log sheet one line. Each of the gears 70′ and 72′ has a greater number of teeth than the largest number (e. g. 250) of log sheet lines expected to be used with the log sheet so that the gears never make a complete revolution during a line spacing program. Each of the gears 70′ and 72′ has the same sets of switch actuating pins **70*a* through 70*d*, and 72*a* and 72*b*, respectively, as in the previously described embodiment and these pins are spaced the same number of teeth apart as before, proceeding in a counter-clockwise direction from the reference pins 70*a* and 72*a*, assuming that the same line spacing program is desired. The only appreciable changes in the mechanism made over the previously described embodiment is the omission of the unidirectional clutch 62, and the hand knob 24 on the shaft 60, and the addition of a switch carrying gear wheel and the control solenoid assembly SR–3. The gear 230 carries the switches 75 and 79. The gear wheel 230 has the same number of teeth as the segment control gear 70′ and is mounted coaxially of the same. The solenoid SR–3 rotates or precesses the new switch carrying gear 230 one tooth clockwise just prior to the initiation of a new recording cycle, or upon depression of the on demand push button DPB, so that the log sheet will be automatically indexed to receive printing in the next available line in the first segment under the control of the long pin 70*a* of the gear 70′. The return line indexing operation is accomplished by reversing the direction of rotation of the idler carriage roll 214 until the long pin engages the just precessed switch arm of the switch 79. During the regular forward line spacing sequence above mentioned, the gear 70′ controls the various line spacing operations in the manner above described as the pins 70*a* through 70*d* successively and intermittently come into contact with the switch arm 80 of the switch 79. Control over line spacing is transferred from the gear 70′ to the gear 72′** in a similar manner as before explained.

Control over line spacing in the off-normal space of the log sheet is effected in almost the identical manner as previously described. The gear 72′ shown in the drawings is driven from the pinion gear 68 and contains two switch actuating pins **72*a* and 72*b* spaced 151 teeth apart in a clockwise direction proceeding from the long pin 72*a*. The pins 72*a* and 72*b* cooperate with the switches 88 and 90 carried by a switch carrying gear 86′ which is identical in construction and operation to the gear 86 previously described except that the gear 86′ has the same number of teeth as the new off-normal control gear 72′. Phasing of the gears 72′ and 86′** is carried out by identical circuitry as that previously described.

Reference should now be made to the circuit diagram of Fig. 15 which shows a portion of the electrical control circuit associated with the switches 75, 79, 88 and 90. Branch circuits *b*, *c*, *d*, *e* and *f* are identical to the corresponding branch circuits shown in Fig. 12*a*. For example, the solenoid SR–1 in branch *e* controls the position of the abnormal count stepping switch SS in the same manner as previously described since off-normal line spacing is effected in the same manner as in the previously described embodiment. Branch *f* contains the solenoid SR–2 which controls the positioning of the switch carrying gear 86′, which also operates the same as in the previously described embodiment. The portion of the control circuit shown in Fig. 12b (the portion of the circuit containing branches i through m) is also utilized with the embodiment of Figs. 14 and 15 but is omitted from Fig. 15.

Before describing other portions of the circuit of Fig. 15 it will be helpful to review the mechanical operations to be performed by the mechanism of Fig. 14. In this latter embodiment, the log sheet is returned to a position to receive printing in the first segment of the log sheet by reversing the direction of rotation of the idler roll 214 using a reversible electric motor M. The control circuit must be such, therefore, that upon depression of the on demand or manual read out push button DPB, or upon hourly closing of a timing switch, the direction of rotation of the motor M should be reversed from its normal or forward direction. Further, since control over line spacing is at that time transferred to the segment control gear 70′, the control circuit must be non-responsive to actuation of the switch arm 80a of switch 79 by the short pins 70b, 70c and 70d which make contact with the last-mentioned switch arm upon reverse or counter-clockwise rotation of the segment control gear 70′. The return line spacing operation ceases when the long pin 70a contacts the switch arm 77a of the switch 75. The switch arms 77a and 80a are similar in appearance to the switch arm 90a shown in Fig. 10 in that they have inwardly turned lips on the ends thereof to enable the pin or pins of the gear 70′ to ride upon the projecting end of these arms from either side of the switch arms. Further, it is necessary to precess the position of the switch 75 so that the line spacing operation terminates in the next unused line of the first segment of the log sheet.

The electric motor M is preferably a two phase induction motor having two windings F1 and F2 which are coupled through relay contacts to power lines P3 and P4, which may be 110-volt A. C. power lines, as distinguished from the lower A. C. or D. C. voltages used on the supply lines P1 and P2 controlling the various relays in the system. In a manner to be described, direction of rotation of the motor M is obtained by switching a phasing capacitor 231 from one field circuit to another. Termination of the line spacing operation is effective by dynamic breaking in the field coil circuit of the motor. That is, one of the field windings F2 is shorted out of the circuit and the other field winding is open when it is desired to terminate the line spacing operation.

The direction of rotation of the motor is controlled by a reverse rotation relay R12 in a branch circuit f″. This branch circuit includes parallel connected sub-branches respectively comprising normally open timing contacts T–3 which momentarily close just prior to the beginning of a new recording cycle, and an alternate branch comprising normally open holding contacts R12–1 and normally closed contacts R1–1 of a log phasing relay R1. The latter relay is in modified branch circuit a′ which contains the normally open contacts 77′ and 77″ of the switch 75 which are closed when the long pin 70a rides upon the projecting end of the switch arm 77a. The branch f″ also has a third alternate sub-branch containing a normally open set of contacts DPB–4 of the on demand or manual read out push out DPB. Thus, when either the timing contacts T–3 or the on demand push button contacts DPB–4 are closed an energization circuit is completed for relay R12 which seals in through the sub-branch containing normally closed contacts R1–1 and the then closed holding contacts R–12–1.

Energization of relay R12 establishes an energization circuit for field coil F1 of motor M extending from power line P3, through the phasing capacitor 231, the then closed contacts R12–6 and the field coil F1 leading to the other power line P4. Energization of the other field coil F2 is effected through a circuit extending from power line P3, the then closed contacts R12–2, field coil F2 and the then closed contacts R12–7 leading to the power line P4. This causes rotation of the motor M in a direction to rotate the feed roll 216 (see Fig. 13) in a clockwise direction as viewed in the last-mentioned figure. This causes rotation of the idler roll 214 in a direction to drive the segment control gear 70′ in a counter-clockwise direction as viewed in Fig. 14. The line spacing operation ceases when the long pin 70a rides upon the projecting end of the the switch arm 77a which closes contacts 77′ and 77″ in branch a′. This initiates energization of relay R1 in branch a′ whose contacts R1–1 in branch f″ open to break the holding circuit of the relay R12. The resultant de-energization of relay R12 opens its aforementioned contacts R12–2, R12–7 and R12–6 and prepares new energization circuits for the motor field coils. One of these circuits extends from power line P3, through the phasing capacitor 231, through the then closed normally closed contacts R12–5, field coil F2 and the then closed normally closed contacts R12–4. The phasing condenser 231 has therefore been transferred from a circuit including the field coil F1 to a circuit including the field coil F2 to prepare the motor for operation in the normal forward direction thereof. The new circuit for field coil F1 may be traced from power line P3 through the then closed normally closed contacts R12–3 through a circuit containing a number of parallel branches outlined by a dotted box containing the sub-branches g–1, g–2 and g–3 corresponding to the contact circuit shown in dotted lines in Fig. 12 and the coil F1 leading to the other power line P4. Whenever a forward line spacing operation is desired, one of the aforementioned branches becomes closed to energize the field coil F1. Since the operation of the sub-branch circuits g–1, g–2 and g–3 are identical to that previously described in connection with the embodiment of Fig. 12, a further detailed description of their operation will be omitted at this point. Suffice it to say that these contacts control the energization of the motor M to effect line spacing between the first segment of the log sheet and the off-normal space ONS. Also, the limit switch L in sub-branch g–3 closes and opens upon the completion of any line which initiates a blind line spacing operation through the closing of contacts in sub-branches g–1 or g–2 until the particular branch opens due to the actuation of one of the switches 79 or 90, depending upon whether control over line spacing is in the segment control gear 70′ or the off-normal space control gear 72′.

Dynamic braking of the motor M during the various line space terminating operations is effected by a shunting branch circuit for the field coil F2 which extends from one field coil terminal through the normally closed contacts R12–4, power line P4, one of the alternate or parallel sub-branches including respectively the normally open contacts R2–3 which are closed whenever a pin on the segment control gear 70′ actuates the switch arm 80a, or the sub-branch containing the normally open contacts R4–3 which close whenever the pin 72b of the off-normal space control gear 72′ actuates the switch 90, the normally closed carriage limit switch L′ which opens when the carriage reaches its limit of movement upon completion of a line of printing in the log sheet, and the normally closed contacts R12–8 leading to the other terminal of the field coil F2. Upon the completion of a printed line, the braking branch circuit is opened when the limit switch L′ opens, thereby initiating rotation of the motor M in a forward direction. The contacts R2–3 and R4–3 are then open and the braking branch circuit is not established again until the pins of the gear 70′ or 72′ again make contact with their respective switches.

The dynamic braking circuit during the return line spacing operation opens to effect the return line spacing operation when normally closed contacts R12–4 in the circuit opens when the reverse rotation relay R12 is energized. Relay R12 becomes de-energized and the braking circuit is again established when the long pin 70a of the segment control gear 70' simultaneously actuates switches 75 and 79.

Precessing of the gear 230 carrying the switches 75 and 79 during each regular recording cycle is effected by the momentary closing of either contacts T–4 in branch circuit *f'* or the closing of the push button contacts DPB–3 in parallel with the timing contacts T–4. The closing of the latter contacts pulses the solenoid SR–3 once to precess or advance the switch carrying gear 230 one tooth in a clockwise direction as viewed in Fig. 14. As above stated, the precession of the gear 230 by one tooth results in the bringing together of the long pin 70*a* and the switch arm 77*a* of switch 75 one line after the last printed line in the first segment of the log sheet.

Another alternate branch for energizing the solenoid SR–3 to phase or reset the gear 230 includes normally open contacts R6–5 of the chart change relay, normally closed contacts R1–2 which open when the long pin 70*a* makes contact with the projecting end of the switch arm 77*a* of the switch 75, and interrupter contacts SR–3–1 of the solenoid SR–3. It can thus be seen that upon depression of the resetting push button CC–2 (see Fig. 12*b*) the resultant energization of relay R6 establishes the last mentioned branch circuit which effects a continuous pulsing of the solenoid SR–3 until the gears 70' and 230 are phased.

Figure 17:
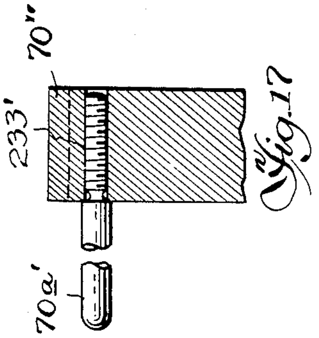
Fig. 17 is a section through the cam gear of Fig. 16.
Figure 16:
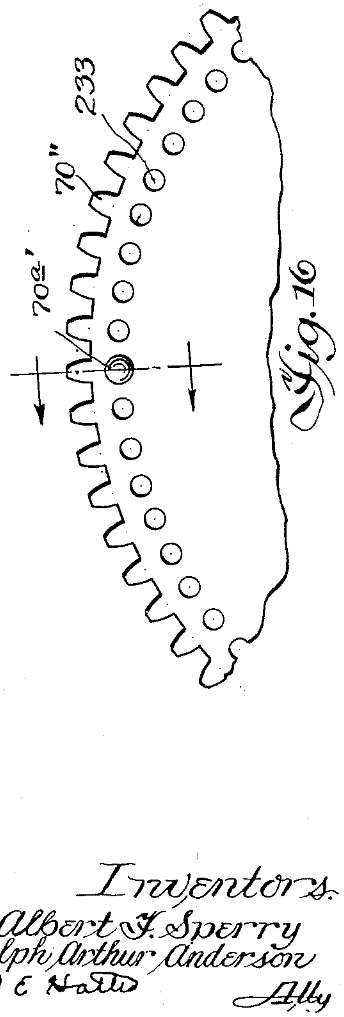
Fig. 16 is a modified form of cam gear where the switch actuating pins may be mounted in any number of alternate positions thereon to vary the line spacing program.

Reference should now be made to the modified segment control gear 70'' shown in Figs. 16 and 17. In this embodiment, a threaded hole 233 is located opposite each tooth of the gear wheel. Each of the holes is adapted to threadedly receive the threaded end of a switch actuating pin, such as 78'. By suitably locating the various pins on this gear, the line spacing pattern may be changed to any number of various line spacing patterns. Obviously, the off-normal space control gear 72' may be similarly designed so that the pins 72*a* and 72*b* may be located at any desired place.

Figure 18:
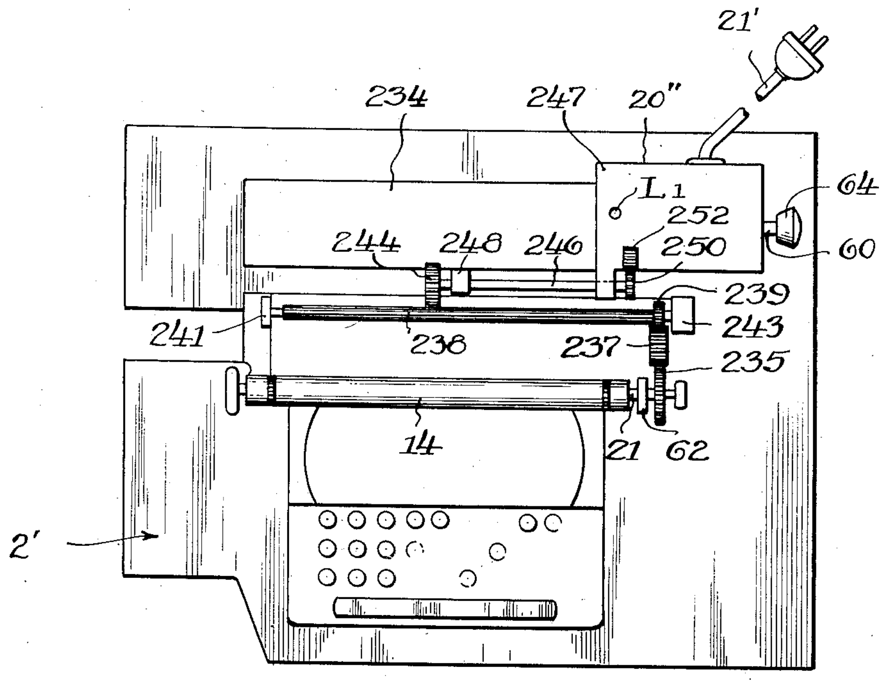
Fig. 18 is a plan view of a modified form of typewriter.

*Embodiment of Fig. 18*

In the previously described embodiments, the line space control mechanism 20 or 20' is supported on the typewriter carriage and coupled directly to the feed roll or platen shaft 21. Refer now to the modified typewriter apparatus of Fig. 18 wherein the line space control mechanism 20'' is supported on a raised stationary portion 234 at the rear of the typewriter 2'. Fig. 18 is a plan view of the typewriter apparatus with the carriage housing 17 removed to expose the parts covered thereby. Line space control mechanism 20'' there shown is substantially similar to the line space control mechanism shown in Figs. 1 and 6 through 11. The main drive shaft 60 of the line space control mechanism is connected to the feed roll or platen 14 through gearing which permits relative movement between the typewriter carriage that carries the feed roll 14 and the line space control mechanism 20''.

This mechanism includes a one-way or unidirectional clutch 62 secured on the end of the feed roll shaft 21 and a pinion gear 235 carried on the end of the feed roll shaft 21 which, through an idler gear 237 and a driven gear 239, drives a splined shaft 238 extending lengthwise of the typewriter carriage. The splined shaft 238 is supported in end bearings 241 and 243 on the typewriter carriage. Meshing with the splined shaft 238 in all positions of the carriage is a gear 244 carried on the end of a shaft 246 journalled in spaced stationary bearings 248 and 250 extending respectively from the raised stationary portion 234 and the housing 247 of the line space control mechanism 20''. Rotation of the shaft 246 is transmitted to the drive shaft 60 of the line space control mechanism by a gear 250 carried on the end of the shaft 246. The gear 250 meshes with a gear 252 connected with the shaft 60 of the line space control mechanism. It can thus be seen when the feed roll 14 is rotated, the rotary motion thereof will be transmitted to the line space control mechanism shaft 60 to operate the cam gears 70 and 72 in the manner above described.

In phasing the segment control gear 70, the control knob 64 on the end of the shaft 60 is rotated in the same direction as previously described and this rotary motion is uncoupled from the feed roll 14 by the unidirectional clutch 12 carried on the end of the feed roll shaft 21.

It should be understood that numerous modifications may be made in the preferred embodiments of the invention above described without deviating from the broader aspects of the invention. For example, line space control mechanism incorporating some of the features of the present invention are usable with recording equipment outside of the field of automatic process logging apparatus. Thus, some aspects of the automatic line space control mechanism above described may be used with a regular hand-operated typewriter to index precisely and automatically a fanfold or other record sheet to receive accounting or other data successively in widely spaced areas thereof. In such case, the cam gears 72 and 86 would probably be omitted since there would be no need for a line spacing program in an off-normal space of the record sheet as above described. Proper placement pins on gears 70 or 70' could carry out any desired line spacing program. If no return line spacing operation is required, there is no need for the processing features of the invention above described.

In the claims, the expression "mechanical control means" should be interpreted to mean a control means which is merely movable.

We claim:

1. In an automatic logging system including means for feeding data on a number of variables to a recording device where data is recorded across a log sheet, said recording device including log sheet feeding means which line-indexes the log sheet to receive data in successive areas thereof, means for controlling the log sheet feeding means to index the sheet from a first area to a second area on the log sheet and then back again to the first area to initiate a new recording cycle and to group data on the same variables in said first area, comprising first mechanical control means movable with said log sheet feeding means for controlling the indexing of said log sheet within said first area thereof, first electric control means for controlling the operation of said log sheet feeding means, said mechanical control means including log sheet precessing means for actuating said electrical control means to terminate a line spacing operation when said log sheet feeding means precesses the log sheet a predetermined number of lines upon completion of each recording cycle, means responsive to the completion of a data recording operation in a line of said log sheet to initiate a continuous or blind line spacing operation, second mechanical control means movable with said log sheet feeding means for controlling the indexing of said log sheet within said second area thereof, second electric control means responsive to said second mechanical control means for controlling the operation of said log sheet feeding means, said second mechanical control means including means for initially actuating said second electric control means at a predetermined point in its path of travel thereof to terminate a line spacing operation when the log sheet is initially positioned to receive data adjacent a predetermined line in said second area of said log sheet, means for varying the relative positions a given amount between said second mechanical control means and said second electrical control means for a given position of the log sheet for each line of recording in said second area of said log sheet so that the log sheet is subsequently automatically indexed to receive printing in the next available line in said second area of the log sheet, and means for changing control over line spacing from said first electric control means to said second electric control means when recording in the first area is complete and for changing control over line spacing from said second electric control means to said first electric control means just prior to the beginning of a new recording cycle.

2. In a recording device including record strip feeding means for moving a data record strip to index the same to receive data in spaced areas thereof, control means for said record strip feeding means for repeatedly indexing said record strip between said areas and for precessing the record strip L number of lines each cycle to group related data obtained at different times, said control means comprising a rotatably mounted member having a switching element thereon, switch means in the path of movement of said switching element of said member in one angular position thereof, means coupling said record strip feeding means to said member for advancing the member an angular amount proportional to the degree of movement imparted to said record strip, means for precessing said record strip once each recording cycle comprising a second rotatable member which carries said switch means for movement in a circular path which is coaxial of the axis of rotation of said first-mentioned member, and means for precessing said switch means carrying member relative to said first-mentioned member a given angular amount for each recording cycle to bring said switching element and said switch means together when said record strip feeding means has positioned the record strip to receive data L number of lines from the last recorded line in the first of said areas, and means for initiating movement of said rotatable record strip feeding means, and means responsive to the bringing together of said switch means and switching element for stopping said record strip feeding means to terminate a line spacing operation.

3. In a recording device for recording data on a record strip, record strip feeding means for supporting a record strip of indefinite length, means for driving said feeding means to feed said record strip to said recording device, control means for controlling said driving means to effect data recording repeatedly in longitudinally spaced areas of the record strip and for precessing the record strip L number of lines each recording cycle to group related data, said control means including means for reversing automatically said feeding means at the end of a recording cycle to bring the first area of said record strip again into position to receive data at the beginning of a new recording cycle L number of lines from the last printed line in the first of said longitudinally spaced areas.

4. In an automatic logging system utilizing an automatic electric typewriter having a transverseable carriage, and carriage return means for automatically returning the carriage to begin a new line, log sheet feeding means mounted on said carriage for movement in either direction, said sheet feeding means being arranged to support a log sheet of indefinite length and on which data on a large number of variables are respectively to be sequentially recorded in vertical columns across the log sheet, means for controlling the movement of said sheet feeding means independently of said carriage return means to line space said log sheet in accordance with a predetermined line spacing pattern, said last-mentioned means comprising an electric motor coupled to said sheet feeding means, means for causing said motor to move said feeding means intermittently in one direction in accordance with a predetermined line spacing pattern for line spacing said log sheet to receive data first in one line and, upon completion of the first line, then in another line spaced a given number of lines from the first line, and means responsive to the completion of a recording cycle for causing said motor automatically to move said feeding means in the opposite direction until the log sheet has been positioned to receive printing a given number of lines below the first printed line to position the sheet for a new recording cycle where data on the same variables occurring at different periods of the day may be grouped together.

5. Recording apparatus including a rotatable record strip feeding means for moving a record strip to effect data recording in spaced areas thereof, control means for said record strip feeding means for indexing said record strip between said areas, said control means comprising a rotatably mounted member having long and short switch actuating means spaced circumferentially thereabout, the angular positions of said switch actuating means on said member being in accordance with a predetermined line spacing program, means coupling said record strip feeding means to said member, means carrying a pair of switches, one of said switches being in the path of movement of a short switch actuating means of said member and the other switch being in the path of movement of a long switch actuating means on said member, means for initiating a blind line spacing operation following the completion of a recording operation in a line of said record strip, means responsive to actuation of one of said switches to terminate a blind line spacing operation in one portion of said record strip, and means responsive to operation by said other switch to terminate a blind line spacing operation in another portion of the record strip.

6. In combination with a typewriter having a movable record sheet feeding means which supports a record sheet on which information is to be typed, said record sheet feeding means being arranged to support a record sheet of indefinite length, means for controlling the moving of said feeding means comprising an electric motor coupled thereto, means for causing said motor to move said feeding means intermittently in one direction in accordance with a predetermined line spacing program for line spacing said record sheet to receive typed data first in one line in a first area on the log sheet, and, upon completion of said one line, then in another line spaced a predetermined number of lines from the first line in a second area on the log sheet, means for automatically causing said motor to move said feeding means in the opposite direction, and means for terminating the movement of said feeding means in said opposite direction when the record sheet has reached a predetermined location thereon spaced a given number of lines from the last printed line.

7. In an automatic logging system including recording means to record data on variables across a record strip and wherein the record strip is to be positioned to receive data successively and repeatedly in spaced areas thereof, line space control apparatus for indexing the record strip comprising first means having a reference switching element for positioning the record strip at the beginning of each recording cycle and another switching element for positioning the record strip to receive printing a given number of lines from the record line determined by said reference switching element, said switching elements having relative positions dependent upon the number of line units between successive stopping points on the record strip, second means supporting switch means thereon, means for moving one of said first and second means relative to the other with movement of said record strip for bringing said switch means and switching elements successively and repeatedly together, means responsive to completion of a data recording operation in a line of said record strip for initiating a continuous or blind line spacing operation of said record strip, means responsive to bringing together of said switch means and said switching elements to terminate said continuous or blind line spacing operation, and precessing means associated with said first and second means for automatically bringing said reference switching element and said switch means together upon advancement of said record strip a given number of lines relative to the last recorded line in the first area of the record strip at the beginning of a new recording cycle to position the record strip to receive new data below previously recorded data.

8. In a logging system including recording means to record data on variables across a record strip and wherein the record strip is to be positioned to receive data successively and repeatedly in spaced areas thereof, line space control apparatus for indexing the record strip comprising first means having a reference switching element for positioning the record strip at the beginning of each recording cycle and another switching element for positioning the record strip to receive printing a given number of lines from the record line determined by said reference switching element, said switching elements having relative positions dependent upon the number of line units between successive stopping points on the record strip, second means supporting switch means thereon, means for moving one of said first and second means relative to the other with movement of said record strip for bringing said switch means and switching elements successively and repeatedly together, means responsive to the bringing together of said switch means and said switching elements to terminate a line spacing operation, and precessing means associated with said first and second means for automatically bringing said reference switching element and said switch means together upon advancement of said record strip a given number of lines relative to the last recorded line in the first area of the record strip at the beginning of a new recording cycle to position the record strip to receive new data below previously recorded data.

9. In an automatic logging system including recording means to record data on variables across a recording strip and wherein the recording strip is to be positioned to receive data successively and repeatedly in spaced areas thereof, line space control apparatus for indexing the record strip comprising first means having a reference switching element for positioning the record strip at the beginning of each recording cycle and another switching element for positioning the record strip to receive printing a given number of lines from the record line determined by said reference switching element, said switching elements having relative positions dependent upon the number of line units between successive stopping points on the record strip, second means supporting switch means thereon, means for moving one of said first and second means relative to the other with movement of said record strip for bringing said switch means and switching elements successively and repeatedly together, means responsive to the bringing together of said switch means and said switching elements to terminate a line spacing operation, and precessing means associated with said first and second means for bringing said reference switching element and said switch means together upon advancement of said record strip a given number of lines relative to the last recorded line in the first area of the record strip at the beginning of a new recording cycle, said precessing means including means for automatically shifting the relative positions of said reference switching element and the switch means for a given line position of the record strip.

10. In an automatic logging system having a recording device including a record strip feeding means for moving a record strip to effect data recording in longitudinally spaced areas thereof, control means for said record strip feeding means for cyclically indexing said record strip between said areas and for precessing the record strip L numbers of lines each recording cycle, said control means comprising a rotatably mounted member having a number of circumferentially spaced switching elements thereon, one of said switching elements acting as a reference control means, means coupling said record strip feeding means to said member, a second member mounted for rotation coaxially of said first member and carrying a pair of switch means in the path of movement of the switching elements of said first member, one of said switch means being in the path of movement of only said reference switching element and the other switch means being in the path of movement of another switching element, the angular positions of said switching elements on said first member being in accordance with a predetermined line spacing program, means responsive to the completion of a recording operation in a line of said record strip for initiating the movement of said record strip feeding means in a forward direction to provide a blind line spacing operation in a forward direction, means for initiating movement of said record strip feeding means in the opposite direction to effect a return blind line spacing operation prior to the beginning of a new recording cycle, means responsive to the bringing together of said other switch means and said another switching element to stop said strip feeding means to terminate a blind line spacing operation in said forward direction, means responsive to the bringing together of said one switch means and said reference switching element to terminate said reverse movement of said record strip feeding means to terminate a return line spacing operation, and means for precessing said second member at the end of a recording cycle in a direction which will bring said reference switching element and said one switch means together L lines ahead of the position at whch they were brought together during the preceding recording cycle.

11. In an automatic logging system having a recording device including a rotatable record strip feeding means for moving a record strip to effect data recording in spaced areas thereof, control means for said record strip feeding means for cyclically indexing said record strip between said areas, said control means comprising a rotatably mounted member having a number of circumferentially spaced switching elements thereon, one of said switching elements acting as a reference control means, means coupling the movement of said record strip feeding means to said member, a second member mounted for rotation coaxially of said first member and carrying a pair of switch means in the path of movement of the switching elements of said first member, one of said switch means being in the path of movement of only said reference switching element and the other switch means being in the path of movement of another switching element, the angular positions of said switching elements on said first member being in accordance with a predetermined line spacing program, means responsive to the completion of a recording operation in a line of said record strip for initiating movement of said record strip feeding means to provide a blind line spacing operation, means for initiating a return blind line spacing operation prior to the beginning of a new recording cycle by initiating movement of said record strip feeding means, means responsive to the bringing together of said other switch means and said another switching element to stop the movement of said record strip feeding means to terminate a blind line spacing operation, and means responsive to operation of said one switch means by said reference switching element to terminate the movement of said record strip feeding means during a return line spacing operation.

12. In an automatic logging system including means for feeding data on a number of variables to a recording device where data is recorded across a log sheet, said recording device including log sheet feeding means which line indexes the log sheet to receive data in successive areas thereof, means for controlling the log sheet feeding means to index the sheet from a first area to a second area on the log sheet, comprising first mechanical control means movable with said log sheet feeding means for controlling the indexing of said log sheet within said first area thereof, first electric control means responsive ot said mechanical control means for controlling the operation of said log sheet feeding means, second mechanical control means movable with said log sheet feeding means for controlling the indexing of said log sheet within said second area thereof, second electric control means responsive to said second mechanical control means for controlling the operation of said log sheet feeding means, said second mechanical control means including means for initially actuating said second electric control means at a predetermined point in its path of travel thereof to terminate a line spacing operation when the log sheet is initially positioned to receive data adjacent to a predetermined line in said second area of said log sheet, and means for automatically changing control over line spacing from said first electric control means to said second electric control means when recording in the first area is complete.

13. In an automatic logging system including means for feeding data on a number of variables to a recording device where data is recorded across a log sheet, said recording device including log sheet feeding means which line indexes the log sheet to receive data in successive areas thereof, means for controlling the log sheet feeding means to index the sheet from a first area to a second area on the log sheet, comprising first mechanical control means movable with said log sheet feeding means for controlling the indexing of said log sheet within said first area thereof, first electric control means responsive to said mechanical control means for controlling the operation of said log sheet feeding means, means responsive to the completion of a data recording operation in a line of said log sheet to initiate a continuous or blind line spacing operation, second mechanical control means movable with said log sheet feeding means for controlling the indexing of said log sheet within said second area thereof, second electric control means responsive to said second mechanical control means for controlling the operation of said log sheet feeding means, said second mechanical control means including means for initially actuating said second electric control means at a predetermined point in its path of travel thereof to terminate a line spacing operation when the log sheet is initially positioned to receive data adjacent to a predetermined line in said second area of said log sheet, and means for automatically varying the relative positions a given amount between said second mechanical control means and said second electrical control means for a given position of the log sheet for each line of recording in said second area of said log sheet so that the log sheet is subsequently automatically indexed to receive printing in the next available line in said second area of the log sheet.

14. In an automatic logging system including means for feeding data on a number of variables to a recording device where data is recorded on a log sheet, said recording device including log sheet feeding means which line indexes the log sheet to receive data in successive areas thereof, means for controlling the log sheet feeding means to index the sheet from a first area to a second area on the log sheet and then back again to the first area to initiate a new recording cycle and to group data on the same variables in said first area, comprising first mechanical control means movable with said log sheet feeding means for controlling the indexing of said log sheet within said first area thereof, first electric control means for controlling the operation of said log sheet feeding means, said mechanical control means including log sheet precessing means for actuating said electrical control means to terminate a line spacing operation when said log sheet feeding means precesses the log sheet a predetermined number of lines upon completion of each recording cycle, means responsive to the completion of a data recording operation in a line of said log sheet to initiate a continuous or blind line spacing operation, second mechanical control means movable with said log sheet feeding means for controlling the indexing of said log sheet within said second area thereof, second electric control means responsive to said second mechanical control means for controlling the operation of said log sheet feeding means, said second mechanical control means including means for initially actuating said second electric control means at a predetermined point in its path of travel thereof to terminate a line spacing operation when the log sheet is initially positioned to receive data adjacent to a predetermined line in said second area of said log sheet, and means for automatically varying the relative positions a given amount between said second mechanical control means and said second electrical control means for a given position of the log sheet for each line of recording in said second area of said log sheet so that the log sheet is subsequently automatically indexed to receive printing in the next available line in said second area of the log sheet.

15. In an automatic logging system including means for feeding data on a number of variables to a recording device where data is recorded on a log sheet, said recording device including log sheet feeding means which line indexes the log sheet to receive data in successive areas thereof, means for controlling the log sheet feeding means to index the sheet from a first area to a second area on the log sheet, and then back again to the first area to initiate a new recording cycle and to group data on the same variables in said first area, comprising first mechanical control means movable with said log sheet feeding means for controlling the indexing of said log sheet within said first area thereof, first electric control means for controlling the operation of said log sheet feeding means, said mechanical control means including log sheet precessing means for actuating said electrical control means to terminate a line spacing operation when said log sheet feeding means precesses the log sheet a predetermined number of lines upon completion of each recording cycle, means responsive to the completion of a data recording operation in a line of said log sheet to initiate a continuous or blind line spacing operation, second mechanical control means movable with said log sheet feeding means for controlling the indexing of said log sheet within said second area thereof, second electric control means responsive to said second mechanical control means for controlling the operation of said log sheet feeding means, said second mechanical control means including means for initially actuating said second electric control means at a predetermined point in its path of travel thereof to terminate a line spacing operation when the log sheet is initially positioned to receive data adjacent to a predetermined line in said second area of said log sheet, and means for automatically changing control over line spacing from said first electric control means to said second electric control means when recording in the first area is complete and for changing control over line spacing from said second electric control means to said first electric control means just prior to the beginning of a new recording cycle.

16. An automatic logging system comprising: a recording device, means for repeatedly feeding a predetermined amount of variable data on a number of variables at spaced time intervals to said recording device which successively records data on the different variables in a first area of the log sheet in lines extending in a first direction on the log sheet and which groups successive data on the same variables in columns or lines extending in a second direction at right angles to said first direction, means for feeding an unpredictable amount of variable data to the recording device between said spaced time intervals, said recording device recording the latter data in successive lines in a second area of the log sheet spaced from said first area in said second direction, said recording device including log sheet feeding means which line indexes said log sheet in said second direction, and means for controlling said log sheet feeding means to provide the aforementioned line spacing program comprising: a first line-indexing terminating means for terminating the movement of said log sheet feeding means for controlling indexing in said first log sheet area, first mechanical control means for operating said first line-indexing terminating means and movable relative thereto and with said log sheet feeding means a given unit distance for each line said log sheet is indexed, said line-indexing terminating means being rendered operative to terminate a line-indexing operation in said first area of said log sheet when said line-indexing terminating means and said mechanical control means reach a predetermined relative position, said two mentioned means being brought into said relative position near the beginning of each of said time intervals when the log sheet has been indexed to receive printing L number of lines from the last printed line in the first area thereof by means which precesses or moves said line-indexing terminating means L unit distances relative to said mechanical control means for a given position of said log sheet before each of said time intervals, means for initiating a blind line spacing operation near the beginning of each of said time intervals, second line-indexing terminating means for terminating movement of said log sheet feeding means for controlling indexing in said second log sheet area, second mechanical control means for operating said second line-indexing terminating means and movable relative thereto and with said log sheet feeding means a given unit distance for each line said log sheet is indexed, said second line-indexing terminating means being rendered operative to terminate line-indexing operation in said second area of said log sheet when said second line-indexing terminating means and said second mechanical control means reach a predetermined relative position, precessing means for automatically moving said second line-indexing terminating means a given unit distance away from said second mechanical control means upon the completion of each line in said second area of said log sheet, whereby the log sheet is automatically indexed to the next available line in said second log sheet area when the log sheet is indexed from the first area to the second area thereof, and means for initiating a blind line spacing operation to line space from said first area to said second area of said log sheet.

17. An automatic logging system comprising: a recording device, means for repeatedly feeding variable data on a number of variables at spaced time intervals to said recording device which successively records data on the different variables in a first area of the log sheet in lines extending in a first direction on the log sheet and which groups successive data on the same variables in columns or lines extending in a second direction at right angles to said first direction, means for feeding an unpredictable amount of variable data to the recording device between said spaced time intervals, said recording device recording the latter data in successive lines in a second area of the log sheet spaced from said first area in said second direction, said recording device including log sheet feeding means which line indexes said log sheet in said second direction, and means for controlling said log sheet feeding means to provide the aforementioned line spacing program comprising: a first line-indexing terminating means for terminating the movement of said log sheet feeding means for controlling indexing in said first log sheet area, first mechanical control means for operating said first line-indexing terminating means and movable relative thereto and with said log sheet feeding means a given unit distance for each line said log sheet is indexed, said line-indexing terminating means being rendered operative to terminate a line-indexing operation in said first area of said log sheet when said line-indexing terminating means and said mechanical control means reach a predetermined relative position, said two mentioned means being brought into said relative position near the beginning of each of said time intervals when the log sheet has been indexed to receive printing L number of lines from the last printed line in the first area thereof, means for initiating a blind line spacing operation near the beginning of each of said time intervals, second line-indexing terminating means for terminating movement of said log sheet feeding means for controlling indexing in said second log sheet area, second mechanical control means for operating said second line-indexing terminating means and movable relative thereto and with said log sheet feeding means a given unit distance for each line said log sheet is indexed, said second line-indexing terminating means being rendered operative to terminate line-indexing operation in said second area of said log sheet when said second line-indexing terminating means and said second mechanical control means reach a predetermined relative position, precessing means for automatically moving said second line-indexing terminating means a given unit distance away from said second mechanical control means upon the completion of each line in said second area of said log sheet, whereby the log sheet is automatically indexed to the next available line in said second log sheet area when the log sheet is indexed from the first area to the second area thereof, and means for initiating a blind line spacing operation to line space from said first area to said second area of said log sheet.

18. An automatic logging system comprising: a recording device, means for repeatedly feeding variable data on a number of variables to said recording device which records data on the different variables in a first area of the log sheet, means for feeding an unpredictable amount of variable data to the recording device following the feeding of said first-mentioned data, said recording device recording the latter data in successive lines in a second area of the log sheet, said recording device including log sheet feeding means which line indexes said log sheet, and means for controlling said log sheet feeding means to provide the aforementioned line spacing program comprising: line-indexing terminating means for terminating movement of said log sheet feeding means for controlling indexing in said second log sheet area, mechanical control means for operating said line-indexing terminating means and movable relative thereto and with said log sheet feeding means a given unit distance for each line said log sheet is indexed, said line-indexing terminating means being rendered operative to terminate line-indexing operation in said second area of said log sheet when the line-indexing terminating means and the mechanical control means reach a predetermined relative position, precessing means for automatically moving said line-indexing terminating means a given unit distance away from said mechanical control means upon the completion of each line in said second area of said log sheet, whereby the log sheet is automatically indexed to the next available line in said second log sheet area when the log sheet is indexed from the first area to the second area thereof, and means for initiating a blind line spacing operation when line spacing from said first area to said second area thereof.

19. In a recording device including record strip feeding means for moving a data record strip to index the same to receive data in spaced areas thereof, control means for said record strip feeding means for repeatedly indexing said record strip between said areas and for precessing the record strip L number of lines each cycle to group related data obtained at different times, said control means comprising a movably mounted member having a switching element thereon, switch means in the path of movement of said switching element of said member in one position thereof, means coupling said record strip feeding means to said member for advancing the member an amount proportional to the degree of movement imparted to said record strip, means for precessing said record strip once each recording cycle comprising a second member which carries said switch means, and means for automatically precessing said switch means carrying member relative to said first-mentioned member a given amount for each recording cycle to bring said switching element and said switch means together when said record strip feeding means has positioned the record strip to receive data L number of lines from the last recorded line in the first of said areas, and means for initiating movement of said rotatable record strip feeding means and means responsive to the bringing together of said switch means and switching element for stopping said record strip feeding means to terminate a line spacing operation.

20. Recording apparatus including a rotatable record strip feeding means for moving a record strip to effect data recording in spaced areas thereof, control means for said record strip feeding means for indexing said record strip between said areas, said control means comprising a rotatably mounted member having long and short switch operating means spaced circumferentially thereabout, the angular positions of said switch operating means on said member being in accordance with a predetermined line spacing program, means coupling rotation of said record strip feeding means to said member, means carrying a pair of contact means, one of said contact means being in the path of movement of a short switch operating means of said member and the other contact means being in the path of movement of a long switch operating means on said member, means for initiating a blind line spacing operation following the completion of a recording operation in a line of said record strip, means responsive to contact of said long switch operating means with said one contact means to terminate a blind line spacing operation in one portion of said record strip, and means responsive to contact of said short switch operating means with said other contact means to terminate a blind line spacing operation in another portion of the record strip.

21. In a data recording system utilizing an electric typewriter as a recording device wherein the system automatically repeatedly and sequentially records digital numerical data on a number of different variables on a record strip and wherein fresh data on the variable is obtained during respective recording cycles, record strip feeding means for supporting said record strip, means for driving said feeding means to feed said record strip to said typewriter for line spacing purposes, control means for controlling said driving means to effect data recording repeatedly in longitudinally spaced areas of the record strip and for precessing the record strip L number of lines each recording cycle to group related data in said spaced areas, said control means including automatic programmer means, including a reference switching element and switch means, means for imparting relative movement between said switching element and switch means as the record strip is advanced for line spacing purposes, for operating said driving means at the end of each recording cycle to advance the record strip until the first area of said record strip is in position to receive data at the beginning of a new recording cycle L number of lines from the last printed line in the first of said longitudinally spaced areas.

22. The recording system as recited in claim 21 wherein said control means including said automatic means comprises means for moving one of said switch means and reference switching element relative to the other in a continuous path for repeatedly bringing said reference switching element and said switch means together, the length of said path being such that the references switching element and said switch means are brought together in succession when a record strip, in the form of a continuous belt, has been indexed once around plus a predetermined number of lines, means for initiating a line spacing operation upon completion of a recording operation in a line of said record strip, and means responsive to the bringing together of said switch means and reference switching element to terminate automatically a line spacing operation.

23. The recording system as recited in claim 21 wherein said means for driving said feeding means is capable of driving said feeding means in but only one direction, said record strip feeding means being adapted to support a continuous belt record strip, and said control means including said automatic means comprises a rotatably mounted member carrying said switching element thereon, said switch means being in the path of movement of the switching element of said member in one angular position thereof, means coupling said record strip feeding means to said member wherein said member is turned one revolution for each N plus L lines of movement of said record strip, to bring said switch means and switching element together once every N plus L number of line indexing operations, N being the total number of lines around the continuous belt record strip, means for automatically initiating movement of said means for driving said feeding means upon completion of a line in said log sheet, and means responsive to the bringing together of said switch means and switching element for stopping said record strip feeding means to terminate a line spacing operation.

References Cited in the file of this patent

UNITED STATES PATENTS

| | | |
|---|---|---|
| 1,133,044 | Carlin | Mar. 23, 1915 |
| 2,138,646 | Scharr | Nov. 29, 1938 |
| 2,255,011 | Lake et al. | Sept. 2, 1941 |
| 2,313,752 | Le Clair | Mar. 16, 1943 |
| 2,690,951 | Moore | Oct. 5, 1954 |
| 2,726,130 | Meadows et al. | Dec. 6, 1955 |